United States Patent
Okubo et al.

(10) Patent No.: US 8,996,791 B2
(45) Date of Patent: Mar. 31, 2015

(54) FLASH MEMORY DEVICE, MEMORY CONTROL DEVICE, MEMORY CONTROL METHOD, AND STORAGE SYSTEM

(75) Inventors: Hideaki Okubo, Saitama (JP); Keita Kawamura, Kanagawa (JP); Toshifumi Nishiura, Tokyo (JP); Hiroaki Yamazoe, Tokyo (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 13/436,282

(22) Filed: Mar. 30, 2012

(65) Prior Publication Data

US 2012/0290769 A1 Nov. 15, 2012

(30) Foreign Application Priority Data

May 9, 2011 (JP) ................................. 2011-104519

(51) Int. Cl.
*G06F 12/02* (2006.01)

(52) U.S. Cl.
CPC .... *G06F 12/0246* (2013.01); *G06F 2212/7202* (2013.01)
USPC .................. 711/103; 711/154; 711/E12.008

(58) Field of Classification Search
None
See application file for complete search history.

(56) References Cited

U.S. PATENT DOCUMENTS

| 5,657,468 | A  | * | 8/1997 | Stallmo et al. | 711/114 |
|---|---|---|---|---|---|
| 5,930,815 | A  | * | 7/1999 | Estakhri et al. | 711/103 |
| 5,941,998 | A  | * | 8/1999 | Tillson | 714/54 |
| 6,775,423 | B2 | * | 8/2004 | Kulkarni et al. | 711/100 |
| 2001/0032326 | A1 | * | 10/2001 | Haneda | 714/54 |
| 2002/0034105 | A1 | * | 3/2002 | Kulkarni et al. | 365/200 |
| 2002/0046323 | A1 | * | 4/2002 | Kawano | 711/114 |
| 2004/0065744 | A1 | * | 4/2004 | Shiraishi et al. | 235/492 |
| 2008/0046639 | A1 | * | 2/2008 | Tsuji | 711/103 |
| 2009/0150599 | A1 | * | 6/2009 | Bennett | 711/103 |
| 2010/0061150 | A1 | * | 3/2010 | Wu et al. | 365/226 |
| 2010/0174876 | A1 | * | 7/2010 | Kasahara et al. | 711/154 |
| 2011/0055458 | A1 | * | 3/2011 | Kuehne | 711/103 |
| 2012/0124276 | A1 | * | 5/2012 | Ahn et al. | 711/103 |
| 2012/0303863 | A1 | * | 11/2012 | Benhase et al. | 711/103 |

FOREIGN PATENT DOCUMENTS

JP 2007-058840 3/2007
JP 2007-193883 8/2007

OTHER PUBLICATIONS

Anand et al. "Cheap and Large CAMs for High Performance Data-Intensive Networked Systems." Proc. 7th USENIX Conf. on Networked Sys. Design & Impl'n, Apr. 2010 [NSDI'10].*

* cited by examiner

*Primary Examiner* — Daniel J Bernard
(74) *Attorney, Agent, or Firm* — Sony Corporation

(57) ABSTRACT

A flash memory device includes a flash memory unit; and a control unit configured to perform control so that data having a size smaller than a block size of the flash memory unit is sequentially written to the flash memory unit.

18 Claims, 29 Drawing Sheets

FIG. 9

| | | | |
|---|---|---|---|
| LOGICAL BLOCK ADDRESS: $C_0$ | PHYSICAL BLOCK ADDRESS: $x_{0,0}$ | PHYSICAL BLOCK ADDRESS: $x_{0,1}$ | |
| LOGICAL BLOCK ADDRESS: $C_1$ | PHYSICAL BLOCK ADDRESS: $x_{1,0}$ | PHYSICAL BLOCK ADDRESS: $x_{1,1}$ | PHYSICAL BLOCK ADDRESS: $x_{1,2}$ |
| LOGICAL BLOCK ADDRESS: $C_i$ | PHYSICAL BLOCK ADDRESS: $x_{i,0}$ | ... | |
| LOGICAL BLOCK ADDRESS: 0xFFFF | PHYSICAL BLOCK ADDRESS: 0xFFFF | ... | |
| LOGICAL BLOCK ADDRESS: $C_{d-1}$ | PHYSICAL BLOCK ADDRESS: $x_{d-1,0}$ | PHYSICAL BLOCK ADDRESS: $x_{d-1,1}$ | |

FIG. 10

| LOGICAL PAGE ADDRESS: 0 | PHYSICAL BLOCK ADDRESS: $x_{1,0}$ | PHYSICAL PAGE ADDRESS: $z_0$ |
|---|---|---|
| LOGICAL PAGE ADDRESS: 1 | PHYSICAL BLOCK ADDRESS: $x_{1,1}$ | PHYSICAL PAGE ADDRESS: $z_1$ |
| ... | PHYSICAL BLOCK ADDRESS: 0xFFFF | PHYSICAL PAGE ADDRESS: 0xFFFF |
| LOGICAL PAGE ADDRESS: i | PHYSICAL BLOCK ADDRESS: $x_{1,2}$ | PHYSICAL PAGE ADDRESS: $z_i$ |
| LOGICAL PAGE ADDRESS: j | PHYSICAL BLOCK ADDRESS: $x_{1,0}$ | PHYSICAL BLOCK ADDRESS: $z_{p-1}$ |
| LOGICAL PAGE ADDRESS: p-1 | | |

| LOGICAL BLOCK ADDRESS | PHYSICAL BLOCK ADDRESS | FINAL WRITING LOGICAL PAGE ADDRESS |
|---|---|---|
| LOGICAL BLOCK ADDRESS: $c_0$ | PHYSICAL BLOCK ADDRESS: $x_0$ | FINAL WRITING LOGICAL PAGE ADDRESS: $z_0$ |
| LOGICAL BLOCK ADDRESS: $c_1$ | PHYSICAL BLOCK ADDRESS: $x_1$ | FINAL WRITING LOGICAL PAGE ADDRESS: $z_1$ |
| LOGICAL BLOCK ADDRESS: $c_i$ | PHYSICAL BLOCK ADDRESS: $x_i$ | FINAL WRITING LOGICAL PAGE ADDRESS: $z_i$ |
| LOGICAL BLOCK ADDRESS: 0xFFFF | PHYSICAL BLOCK ADDRESS: 0xFFFF | FINAL WRITING LOGICAL PAGE ADDRESS: 0xFFFF |
| LOGICAL BLOCK ADDRESS: $c_{e-1}$ | PHYSICAL PAGE ADDRESS: $x_{e-1}$ | FINAL WRITING LOGICAL PAGE ADDRESS: $z_{e-1}$ |

77

X5, X6

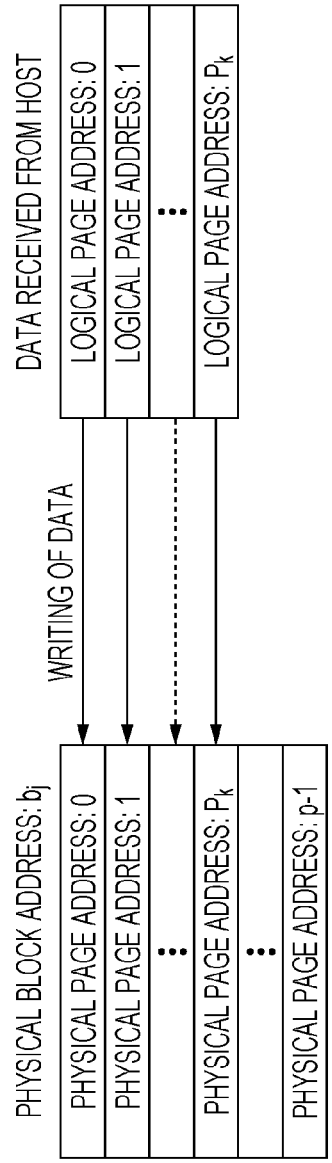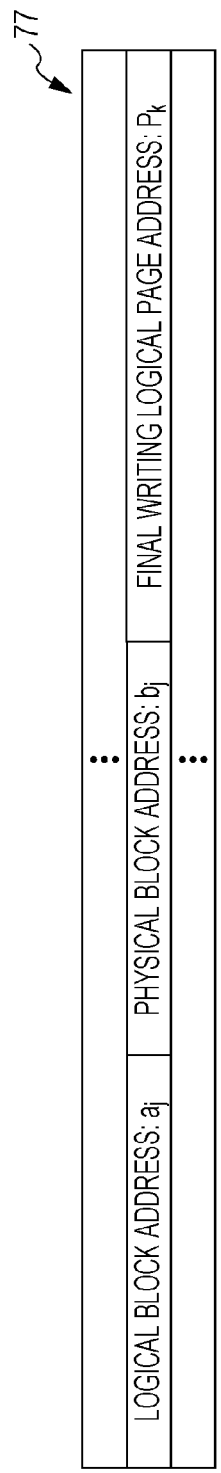
FIG. 20A
FIG. 20B

FLASH MEMORY DEVICE, MEMORY CONTROL DEVICE, MEMORY CONTROL METHOD, AND STORAGE SYSTEM

CROSS REFERENCES TO RELATED APPLICATIONS

The present application claims priority to Japanese Priority Patent Application JP 2011-104519 filed in the Japan Patent Office on May 9, 2011, the entire content of which is hereby incorporated by reference.

BACKGROUND

The present disclosure relates to a flash memory device including a flash memory, a memory control device for a flash memory, a method for the memory control device, and a storage system.

Some digital camera devices that capture, for example, a moving image or a still image use a memory card having a flash memory installed therein as a recording medium for image-captured data. In particular, there has been an increasing demand for data recording to be performed at a high speed with regard to a memory card used for moving image recording.

In a memory card having a flash memory installed therein, data in a flash memory has been managed by two types of management methods: block-level management and page-level management.

As is well familiar, in the block-level management, data is managed in units of the block size of a flash memory, and in page-level management, data is managed in units of the page size of a flash memory. The block is formed of a plurality of pages, and therefore, "block size>page size".

Here, in page-level management, management of a data size unit smaller than that of the block-level management is possible. In block-level management and page-level management, when comparing the working memory that is necessary for a memory card, it can be seen that page-level management becomes necessary for a working memory of a larger size. Therefore, in order to manage all the flash memory inside a memory card in accordance with page-level management, a large working memory is necessary.

For this reason, in a memory card including a flash memory, some data is managed by page-level management, and the remaining data is managed by block-level management.

Specifically, in a memory card including a flash memory, in a case where the size of data for which writing is requested from a host device (for example, the above-mentioned digital camera device) side is small, received data is managed by page-level management, and in a case where the data size is large, received data is managed by block-level management.

Furthermore, in a case where the total amount of the data of a small size, which is written from the host device, exceeds the size that can be managed by page-level management, the management unit of a part of data is changed from being under page-level management to block-level management. This is what is commonly called garbage collection (for example, refer to Japanese Unexamined Patent Application Publication Nos. 2007-193883 and 2007-58840).

SUMMARY

However, the occurrence of garbage collection causes the performance (recording speed) of a memory card to decrease. Therefore, in order to realize high-speed recording, it is preferable that the frequency with which garbage collection is generated be decreased as much as possible.

Additionally, the block size of a flash memory has a tendency to increase as the generation of the flash memory progresses. The reason for this is that if the block size is made to be large, it is possible to realize higher speed data writing at a speed corresponding to that increase.

However, in a case where the block size is increased so as to attempt to realize higher speed writing, it is necessary for the host device side, which is the writing data sending side, to increase the size of the buffer memory for sending data in a manner corresponding to the above. In a case where the size of the above-mentioned buffer memory is less than the expanded block size, it is not possible for a combination with the host device to perform data writing by block level management on the memory card side, and recording under the page level management is performed, with the result that it is difficult to realize high-speed recording.

It is desirable to achieve a higher recording speed by effectively decreasing the generation frequency of garbage collection with regard to a memory device (flash memory device) including a flash memory, and also to realize a higher recording speed without expanding the size of the buffer memory for sending writing data on the host device side.

A flash memory device of the present disclosure includes a flash memory unit, and also includes a control unit for performing control so that data having a size smaller than the block size of the flash memory unit is sequentially written to the flash memory unit.

Furthermore, the memory control device of the present disclosure performs control so that data having a size smaller than the block size of the flash memory unit is sequentially written to the flash memory unit.

Furthermore, a storage system of the present disclosure includes a flash memory unit, an instruction unit that instructs the writing of data to the flash memory unit, and a control unit that performs control so that data having a size smaller than the block size of the flash memory unit, for which writing has been instructed by the writing instruction unit, is sequentially written to the flash memory unit.

According to the present disclosure, data having a size smaller than the block size for which it is difficult to perform recording by block-level management can be sequentially written to the flash memory unit. Here, the term "sequential writing" means that writing target data is written in order of logical addresses to the target physical block in a predetermined writing unit.

In the flash memory device of the related art in which data writing is performed in accordance with two types of management, specifically, block level management and page-level management, in a case where the size of data to be written matches the block size, recording by block level management is performed, and data having a size smaller than the block size is written by page level management. For this reason, even if, for example, the data having a size smaller than the block size is individual data that is consecutive in a logical address manner, writing under page level management is performed on those individual data.

In comparison, according to the present disclosure in which sequential writing is made possible, sequential writing can be performed on data having a size smaller than the block size. That is, for example, in the case such as that described above, individual data can be effectively prevented from being distributed to different physical blocks and recorded as in the case of writing under page level management.

That is, according to the present disclosure in which sequential writing is made possible, when compared to the related art in which only writing by page level management is the only choice with regard to data having a size smaller than the block size, it is possible to effectively decrease the generation frequency of garbage collection. Performance improvement can be achieved in terms of recording speed in comparison with the related art.

Furthermore, in the related art as described above, in a case where the host device side includes only a buffer memory of a size smaller than the block size, the host device side can only send data having a size smaller than the block size. Therefore, also in this case, even if data is consecutive in a logical address manner, in a flash memory device of the related art, writing under page level management is selected.

In comparison, according to the present disclosure in which sequential writing is made possible, even in a case where only data having a size smaller than the block size can be sent from the host device side, those data can be sequentially written, that is, can be recorded to a predetermined physical block in order of logical addresses. According to this processing, unlike the case in which recording under page level management is performed, it is possible to decrease the generation frequency of garbage collection, and performance improvement can be achieved in this respect.

According to the present disclosure, recording speed can be increased by effectively decreasing the generation of garbage collection to less than that in the related art.

Furthermore, also in a case where writing is to be performed from a host device having a small buffer memory size for data transfer, it is possible to realize high-speed data recording.

Additional features and advantages are described herein, and will be apparent from the following Detailed Description and the figures.

BRIEF DESCRIPTION OF THE FIGURES

FIG. 9 illustrates the data structure of a page-level management table;

FIG. 10 illustrates the data structure of a page-level map;

FIG. 11 illustrates the data structure of a sequential writing block management table;

FIGS. 20A and 20B illustrate, as an example, sequential writing, and the content of the sequential writing block management table after the sequential writing;

DETAILED DESCRIPTION

Embodiments according to the present disclosure will be described below.

The description will be given in the following order.
1. First Embodiment
1-1. Configuration of storage system
1-2. Data management technique
1-3. Memory control technique in first embodiment
2. Second Embodiment
3. Modification Here, a first embodiment is an embodiment in which a flash memory device by itself changes the data writing technique on the basis of the logical address and the data size regarding writing data that is specified using a write command by a host side to a flash memory device side. A second embodiment is an embodiment in which a host side explicitly notifies a flash memory device of the switching of the writing technique by using a write command, and in response to this, the flash memory device changes the data management technique.

1. First Embodiment 1-1. Configuration of Storage System

Figure 1:
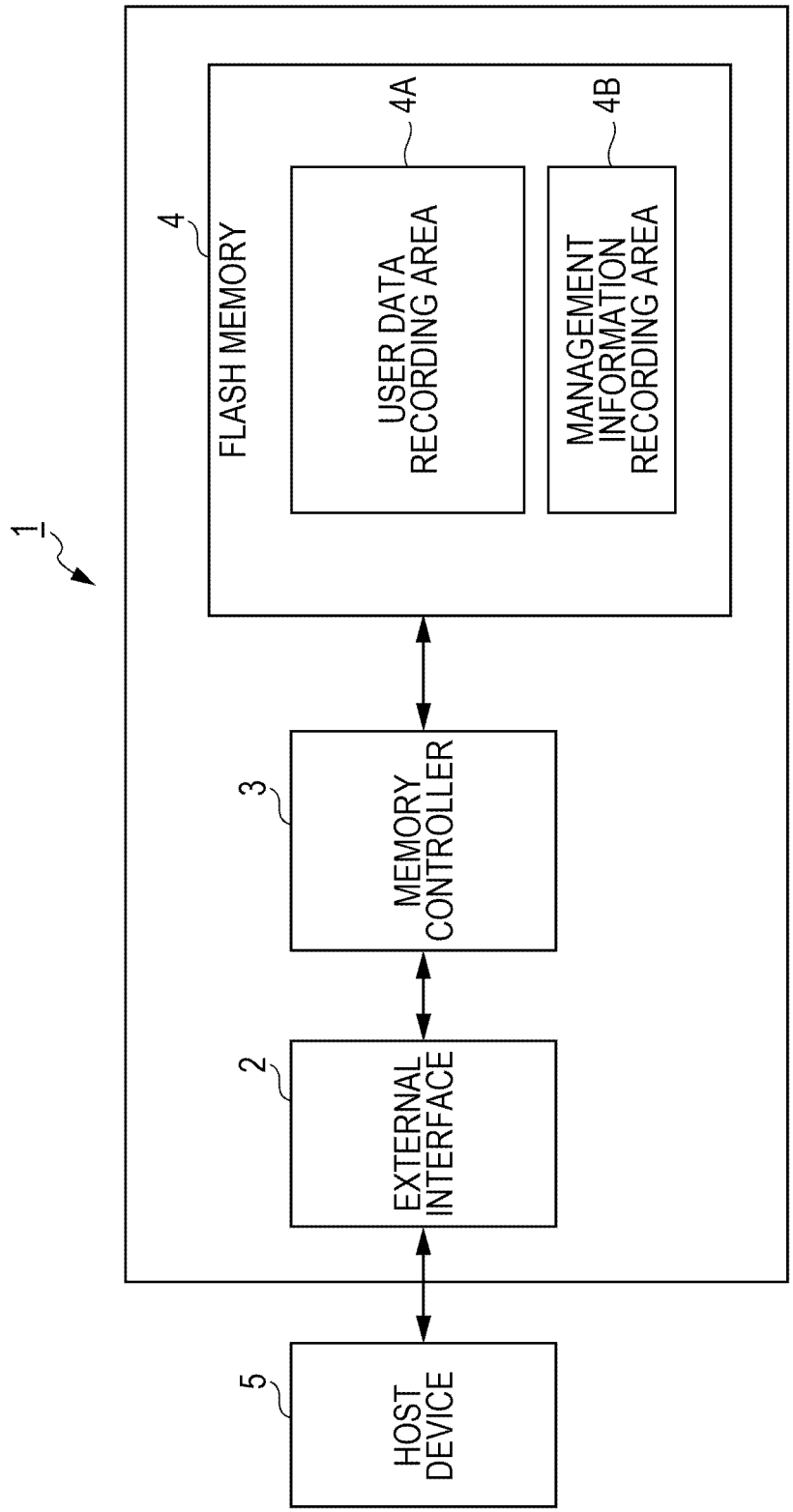
FIG. 1 illustrates the configuration of a storage system according to an embodiment.

FIG. 1 illustrates the configuration of a storage system of an embodiment.

The storage system of the embodiment is configured to include a flash memory device 1 and a host device 5.

The host device 5 transmits a read command or write command to a flash memory device 1 so as to read or write the data recorded in the flash memory device 1.

In the case of this example, it is assumed that the host device 5 is, for example, a digital camera device that captures a still image or a moving image and that performs recording/reproduction of the data thereof.

The flash memory device 1, as shown in FIG. 1, includes a flash memory 4, an external interface 2, and a memory controller 3.

The flash memory 4 is formed as a NAND-type flash memory, to and from which recording (writing)/reproduction (reading) of data is performed under the control of the memory controller 3.

A user data recording area 4A and a management information recording area 4B are provided in the flash memory 4. In the user data recording area 4A, as physical blocks in which data has been written, three types of blocks exist: a block-level management block 30, a page-level management block 40, and a sequential writing management block 50, which will be described later.

Furthermore, in the management information recording area 4B, a management information block 60 in which data for managing the block-level management block 30, the page-level management block 40, and the sequential writing management block 50 is recorded exists.

The memory controller 3 is formed of a microcomputer including a central processing unit (CPU), a read only memory (ROM), and a random access memory (RAM), and performs the entire control of the flash memory device by performing, for example, processing in accordance with a program stored in the above-mentioned ROM.

Specifically, the memory controller 3 performs the interpretation of a command received by the external interface 2, a conversion process from a logical address to a physical address by using various management information (to be described later), writing and reading of data to and from the flash memory 4, generation/addition of error correction code (ECC) data at the time of writing data to the flash memory 4, an ECC error correction process at the time of reading, and the like.

The external interface 2 is provided to enable transmission and reception of various data between the host device 5 and the memory controller 3, and performs the reception of commands from the host device 5 and the transmission and reception of data.

Here, when data of the flash memory 4 is to be read, the host device 5 sends to the memory controller 3, as a read command, a command that specifies the beginning logical address (specified by at least a set of a logical block address and a logical page address) at which reading data exists, and the data size. In response to this, the memory controller 3 reads data at a specified size from the specified logical address, and sends this data to the host device 5.

Furthermore, when data is to be written, the host device 5 sends, as a write command, a command that specifies the beginning logical address of a data writing destination and the data size. In response to this, the memory controller 3 performs writing in the flash memory 4 so that the data of the specified size is recorded at the specified logical address.

1-2. Data Management Technique

A technique for managing data recorded in the flash memory 4 will be described below.

First, a physical address and a logical address will be described.

In the flash memory 4, a physical address is used as an address that indicates the position information of data recorded in the flash memory 4.

Figure 2:
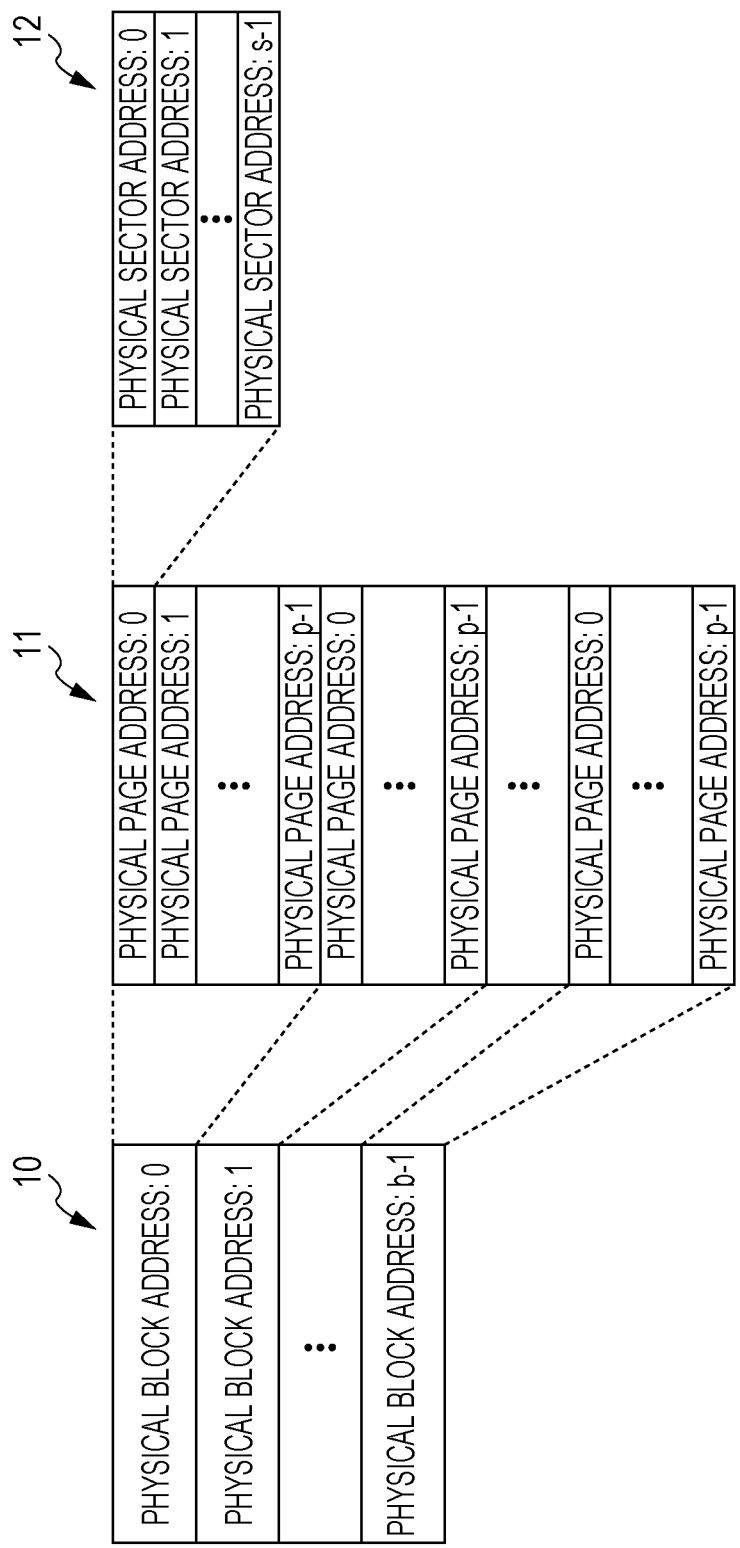
FIG. 2 illustrates the outline of physical addresses that are used in a flash memory.

FIG. 2 illustrates the outline of physical addresses used in the flash memory 4. In the flash memory 4, as physical addresses, three types of addresses are used: a physical block address, a physical page address, and a physical sector address.

In FIG. 2, a physical block 10 corresponds to a block, which is a minimum erasure unit of a NAND flash memory used in the flash memory 4, and data is read in the flash memory 4.

In FIG. 2, the number of blocks in which read/program/erase of data is performed is set to "b", and physical block addresses from 0 to b−1 are assigned to the blocks.

The physical block 10 is divided into physical pages 11. Each physical page 11 corresponds to a page, which is a minimum program unit of a NAND flash memory. One physical page address is assigned to the pages in the physical block 10 in ascending order from the beginning page.

In FIG. 2, the number of physical pages 11 that exist in the physical block 10 is set to "p", and physical page addresses from 0 to p−1 are assigned to the physical pages 11.

A physical sector 12 matches the size of the minimum area (sector) that is specified at the logical address used by the host device 5. Each of the physical pages 11 is divided into a plurality of physical sectors 12, and a physical sector address is assigned in ascending order to a corresponding physical sector 12.

In FIG. 2, it is assumed that each of the physical pages 11 is divided into physical sectors 12. In this case, the physical sector addresses from 0 to s−1 are assigned to the physical sectors 12.

In the flash memory device 1, physical addresses are associated with logical addresses of data. In order to associate the logical addresses with physical addresses, the logical addresses are handled as three types of addresses: logical sector address, logical page address, and logical block address.

Figure 3:
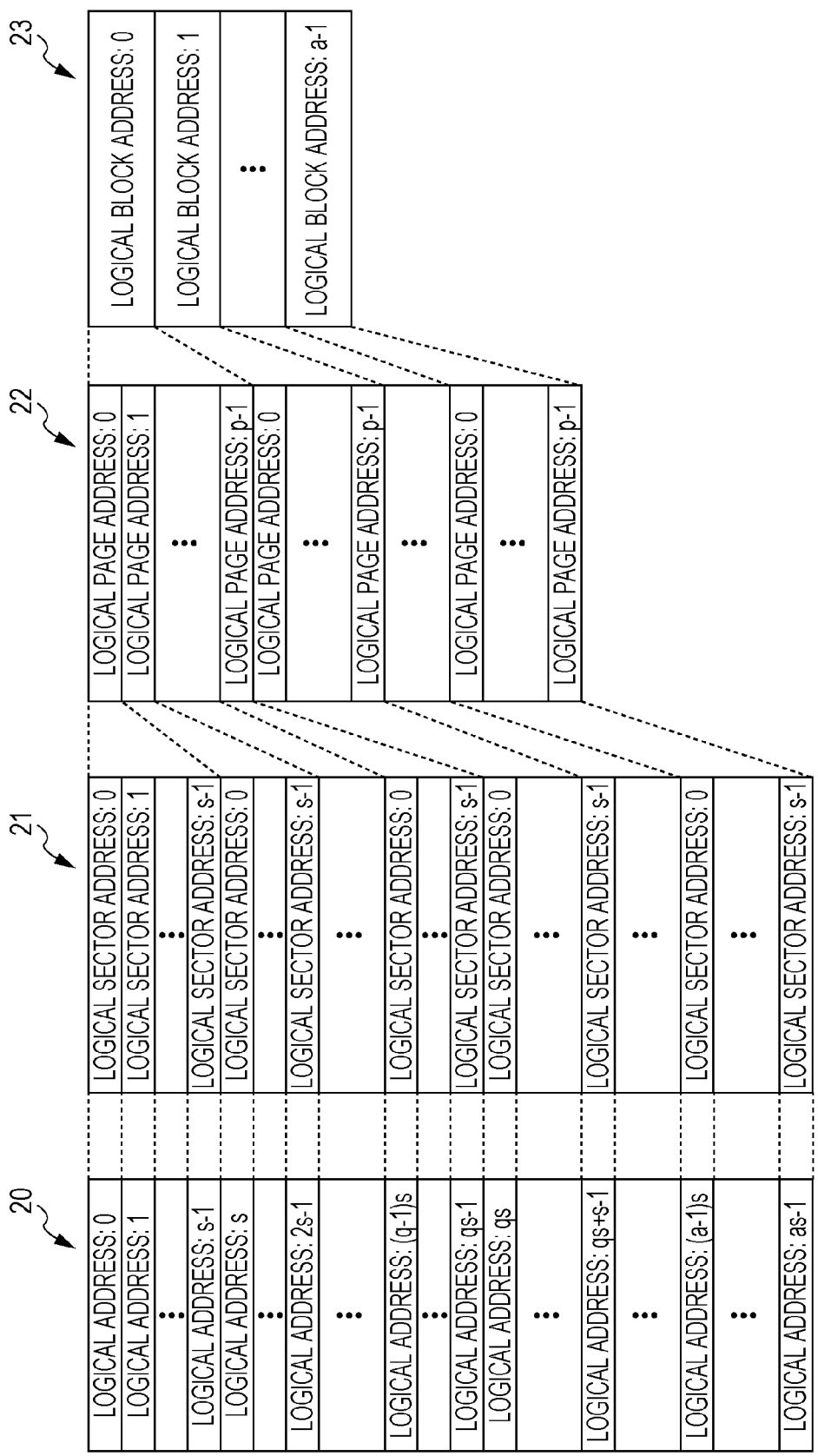
FIG. 3 illustrates the outline of logical sector addresses, logical page addresses, and logical block addresses.

FIG. 3 illustrates the outline of a logical sector address, a logical page address, and a logical block address.

The addresses of a logical address space 20 that can be handled by the host device 5 in the flash memory device 1 is assumed to be from 0 to a s−1. One logical sector address is assigned to one corresponding logical address. In FIG. 3, the logical addresses are assigned to the logical sector addresses from 0 to s−1. Here, "s" is the number of physical sectors 12 that exist in the physical page 11.

The logical page 22 is formed of a plurality of logical sectors 21. In FIG. 3, "s" logical sectors 21 form one logical page 22, and the logical page addresses from 0 to p−1 are assigned to all the logical pages 22. "p" is the number of physical pages 11 that exist in one physical block 10.

A logical block 23 is formed of a plurality of logical pages 22. In FIG. 3, "p" logical pages 22 form one logical block 23, and the logical block addresses from 0 to a−1 are assigned to all the logical blocks 23.

Next, a description will be given of specific data structures of various physical blocks that are recorded in the flash memory 4.

Figure 4:
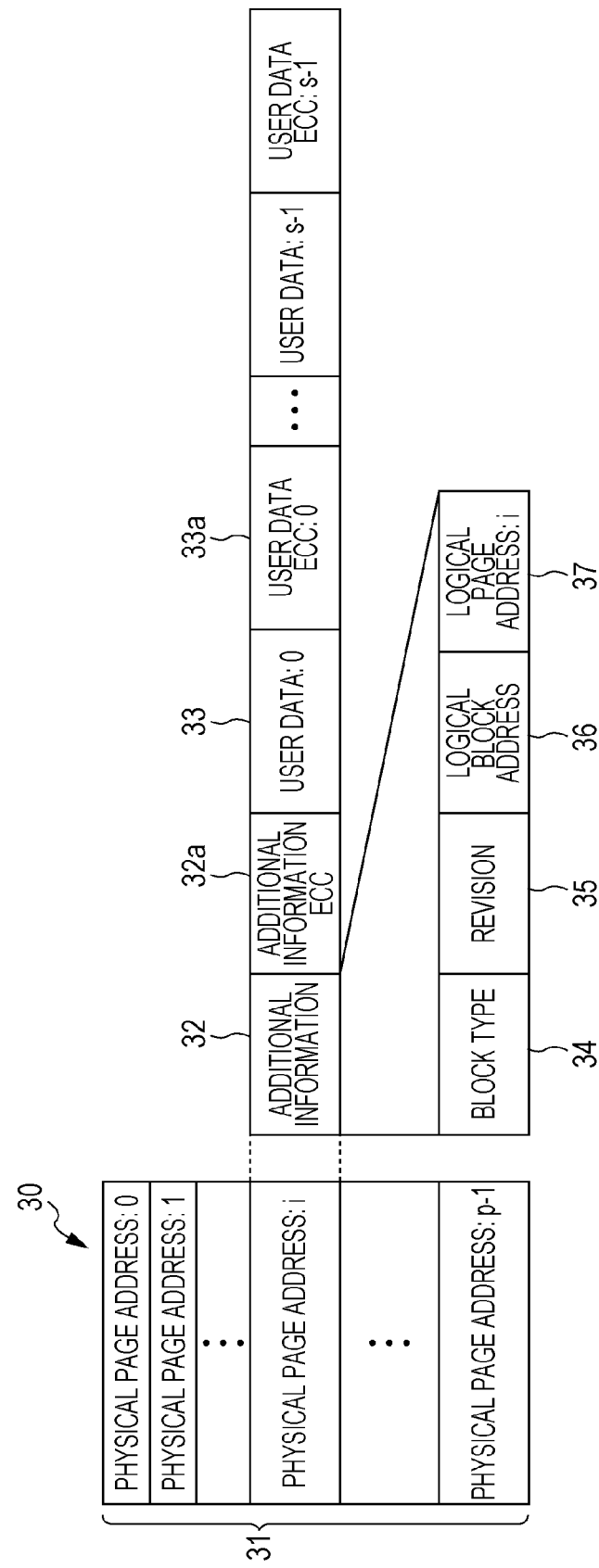
FIG. 4 illustrates the data structure of a block-level management block.

FIG. 4 illustrates the data structure of the block-level management block 30.

Here, the block-level management block 30 means a physical block on which writing (block level writing) by block-level management has been performed.

Data is written in all the physical pages of the block-level management block 30 (in FIG. 4, a written page 31). The reason for this is that, in block level writing, data at a size for the amount of one block is written to one physical block.

As shown in FIG. 4, additional information 32, additional information ECC 32a, user data 33, and a user data ECC 33a are recorded in one physical page. The additional information 32 is formed of information items: a block type 34 indicating being the block-level management block 30, a revision 35 indicating the generation information of the block-level management block 30, the logical block address 36 of data written in the block-level management block 30, and a logical page address 37 corresponding to the physical page in which the relevant additional information 32 is stored.

The logical block addresses 36 have the same value in the same block-level management block 30.

Furthermore, in the block-level management block 30, the value of the logical page address 37 matches the physical page address of the physical page in which the data of the logical page address 37 has been written. Specifically, it is shown in FIG. 4 that a physical page address i matches the logical page address i of the data that is written at the relevant physical page address i.

In addition, the logical sector address matches the physical sector address.

At this time, the size of the user data 33 matches the size of the physical sector, and the number of user data 33 that can be recorded in one physical page matches the number of physical sectors in the physical page.

Figure 5:
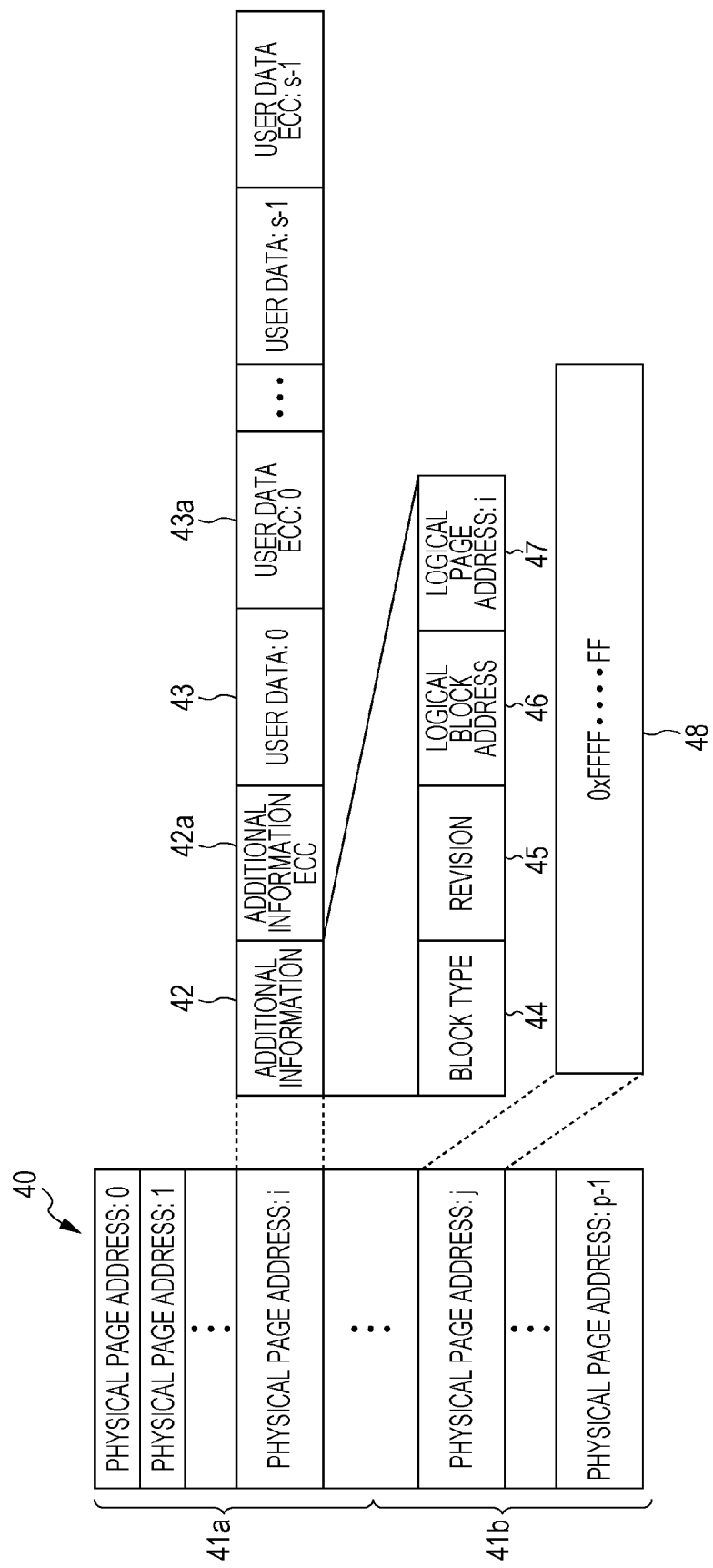
FIG. 5 illustrates the data structure of a page-level management block.

FIG. 5 illustrates the data structure of a page-level management block 40.

The page-level management block 40 indicates a physical block that has been used in writing (page level writing) by page-level management.

The page-level management block 40 contains a written page 41a and a not yet written page 41b.

As shown in FIG. 5, in a physical page serving as the written page 41a, additional information 42, additional information ECC 42a, user data 43, and user data ECC 43a are recorded.

The additional information 42 is formed of the information items of a block type 44 indicating being the page-level management block 40, a revision 45 indicating the generation information of the page-level management block 40, a logical block address 46 of the data that is written in the page-level management block 40, and a logical page address 47 corresponding to a physical page in which the relevant additional information 42 has been stored.

Also in this case, all the logical block addresses 46 have the same value in all the same page-level management blocks 40.

However, in the case of the page-level management block 40, the value of the logical page address 47 does not necessarily match the physical page address of the physical page in which the data of the relevant logical page address 47 has been written. The reason for this is that, in page level writing, data of a small size less than the block size is distributed to respectively different physical blocks and recorded.

Furthermore, also in the page-level management block 40, the logical sector address matches the physical sector address.

Also in this case, the size of the user data 43 matches the size of the physical sector, and the number of user data 43 that can be recorded in one physical page matches the number of physical sectors in the physical page.

Furthermore, in the page-level management block 40, the not yet written page 41b enters a state in which 0xFFFF, which is an initial value of a NAND flash memory, has been recorded, as shown in FIG. 5.

Figure 6:
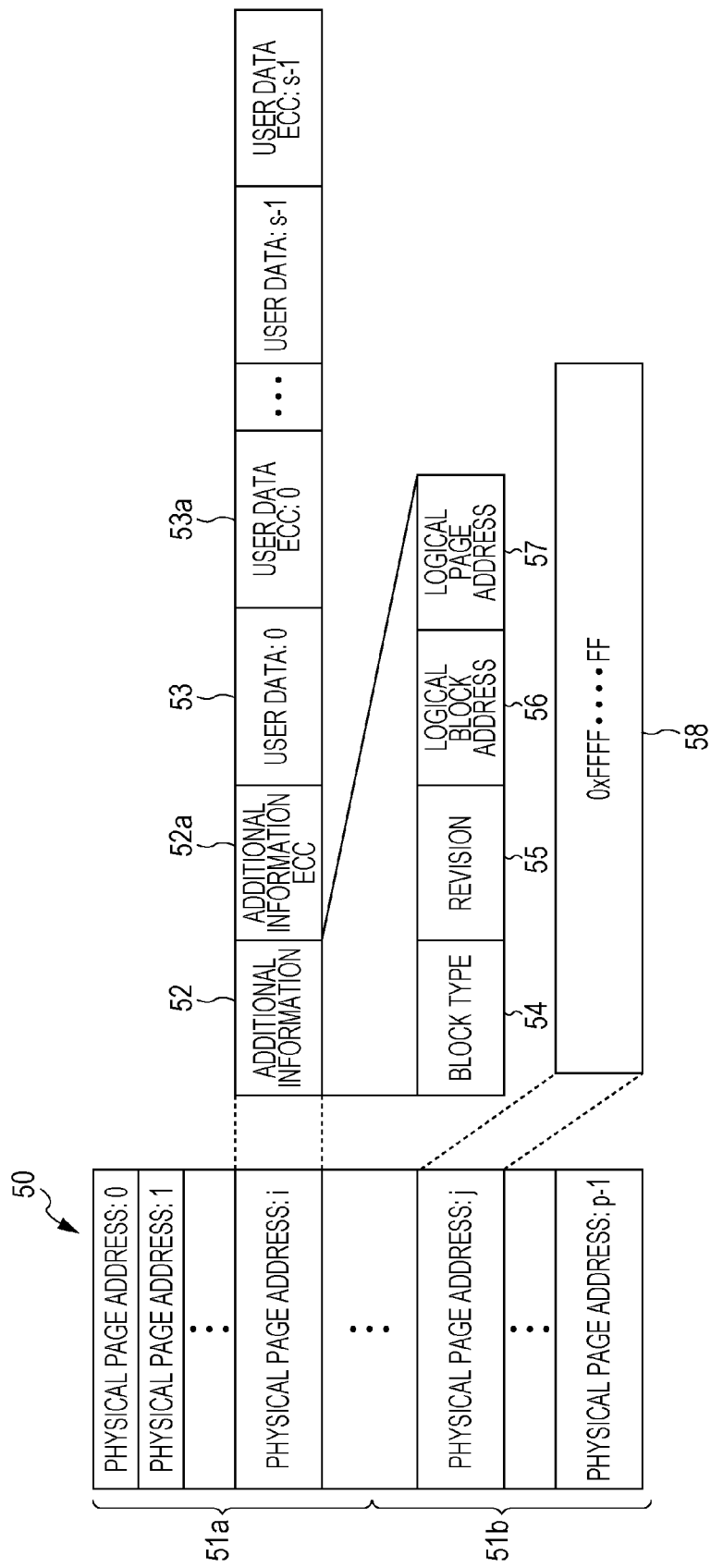
FIG. 6 illustrates the data structure of a sequential writing management block.

FIG. 6 illustrates the data structure of a sequential writing management block 50.

The sequential writing management block 50 is a physical block that has been used in sequential writing in an embodiment (to be described later).

The sequential writing management block 50 includes a written page 51a and a not yet written page 51b.

In the physical page of the written page 51a, additional information 52, additional information ECC 52a, user data 53, and user data ECC 53a are recorded. The additional information 52 is formed of information items of a block type 54 indicating being the sequential writing management block 50, a revision 55 indicating the generation information of the sequential writing management block 50, a logical block address 56 of data written in the sequential writing management block 50, and a logical page address 57 corresponding to a physical page in which the relevant additional information 52 has been stored.

Also in this case, the logical block address 56 have the same value in all the same sequential writing management blocks 50.

Furthermore, in the sequential writing management block 50, similarly to the case of the block-level management block 30 shown in FIG. 4, the value of the logical page address 57 matches the physical page address of the physical page in which the data of the relevant logical page address 57 has been written (in FIG. 6, the value i of the physical page address at which the additional information 52 has been stored matches the value i of the logical page address 57 that has been stored in the relevant additional information 52. The reason for this is that, as will be described later, in sequential writing, the logical page data that is consecutive in a logical address manner, for which writing has been instructed from the host device 5 side, is recorded in the order of physical page addresses to the physical block that is selected as the sequential writing management block 50.

Furthermore, also in the sequential writing management block 50, the logical sector address matches the physical sector address.

This case is also the same as in the case of FIGS. 4 and 5 in that the size of the user data 53 matches the size of the physical sector, and the number of user data 53 that can be recorded in one physical page matches the number of physical sectors in the physical page.

Furthermore, as illustrated in FIG. 6, also in this case, the stored value of the not yet written page 51b is an initial value (0xFFFF).

Figure 7:
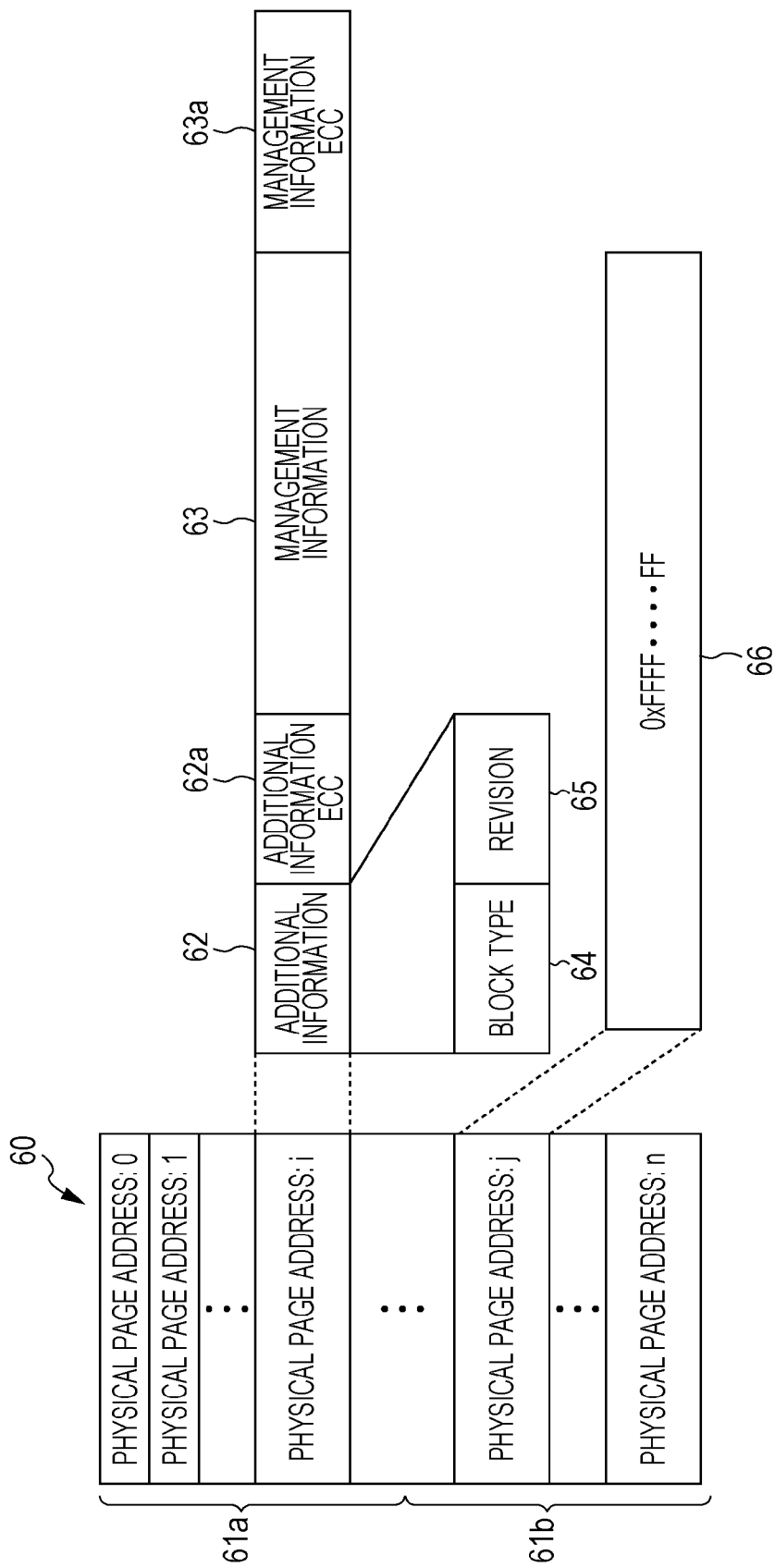
FIG. 7 illustrates the data structure of a management information block.

FIG. 7 illustrates the data structure of the management information block 60.

The management information block 60 is a physical block for storing various management information, which is shown in FIGS. 8 to 12 later.

In FIG. 7, the management information block 60 contains a written page 61a and a not yet written page 61b.

In the physical page of the written page 61a, additional information 62, additional information ECC 62a, management information 63, and management information ECC 63a are recorded. The additional information 62 is formed of information items of a block type 64 indicating being the management information block 60, and a revision 65 indicating the generation information of the management information block 60.

Figure 8:
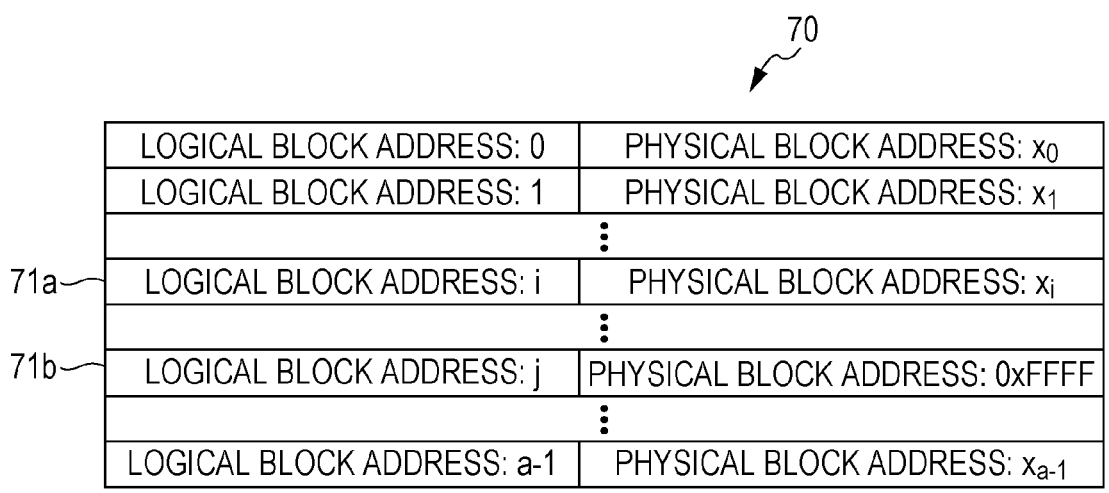
FIG. 8 illustrates the data structure of a block-level management table.
Figure 12:
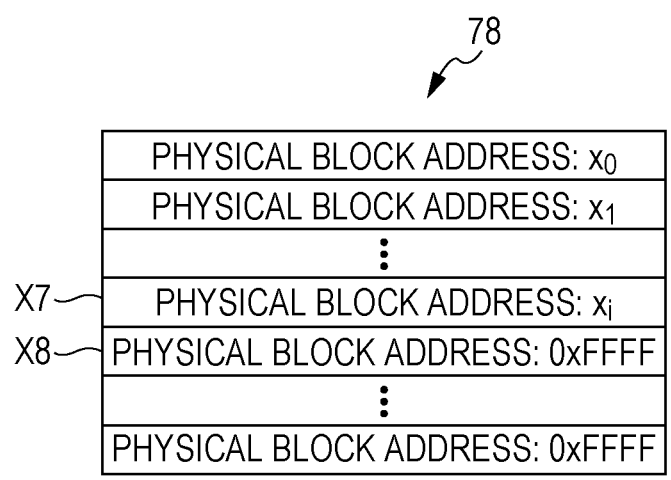
FIG. 12 illustrates the data structure of an invalid data block management table.

The management information recorded as the management information 63 includes a block-level management table 70 shown in FIG. 8, a page-level management table 75 shown in FIG. 9, a page-level map 76 shown in FIG. 10, a sequential writing block management table 77 shown in FIG. 11, and an invalid data block management table 78 shown in FIG. 12.

FIG. 8 illustrates the data structure of a block-level management table 70.

The block-level management table 70 is management information for enabling block-level management, and is information such that, as illustrated in FIG. 8, the logical block addresses and the physical block addresses are associated with each other.

Here, the number of logical block addresses that are held in the block-level management table 70 matches the number (set to "a" in FIG. 8) of logical blocks, to and from which the host device 5 can write/read data.

In FIG. 8, a physical-block-assigned logical block 71a means a logical block such that the data in the logical block has been recorded to a certain physical block.

The logical block address of such a logical block 71a is held in such a manner that the address of the (assigned) physical block in which the data has been recorded has been associated with the logical block 71a.

On the other hand, in the block-level management table 70, the logical block address of the logical block 71b in which a physical block has not yet been assigned is held in such a manner that an invalid physical block address (0xFFFF) has been associated with the logical block 71b.

In the block-level management table 70, in a case where, for example, block level writing is performed on the data of a certain logical block address, the value (0xFFFF) of the physical block address associated with the logical block address is updated to the address value of the physical block in which the writing of the relevant data has been performed.

FIG. 9 illustrates the data structure of the page-level management table 75.

The page-level management table 75 is formed in such a manner that physical block addresses are associated with logical block addresses, as shown in FIG. 9.

The page-level management table 75 is management information for managing the correspondence between a logical block and a physical block (that is, the page-level management block 40 shown in FIG. 5) in which the recording of the data of the logical page in the logical block has been performed, and is management information used in the recording (page level writing) by page-level management.

It is set in the Page-level management table 75 that, for logical block addresses, "d" addresses that have been determined in advance can be held, and for physical block addresses, "f" addresses that have been determined in advance can be held. At this time, f≧d.

As described above, in page level writing, the number of logical/physical blocks that can be used in page level writing are limited. In a case where the number of physical blocks used in the page level writing exceeds "f" described above, garbage collection is made to occur, and a usable physical block is newly secured.

In FIG. 9, in the logical block address to which the physical block (page-level management block 40) is assigned, which is indicated by X1 in FIG. 9, the physical block address of the physical block is held.

Furthermore, in the logical block address in which a page-level management block has not yet been assigned, which is indicated by X2, an invalid physical block address (0xFFFF) is held, which indicates a state in which the page-level management table 75 has a vacancy.

Furthermore, there is a case in which a plurality of physical block addresses are associated with one logical block address as in a case where, in the page-level management table 75, for example, a physical block address $x_{0,0}$ and a physical block address $x_{0,1}$ are associated with a logical block address $C_0$ in FIG. 9.

That is, this is because, as described above, in page level writing, data in a certain logical block is recorded in such a manner as to be distributed to a plurality of physical blocks.

FIG. 10 illustrates the data structure of the page-level map 76.

The page-level map 76 is a management information for identifying the address (identified by a set of a physical block address and a physical page address) of a physical page in which the recording of the logical page data in a certain logical block has been performed, and is formed in such a way that, as shown in FIG. 10, physical block addresses and physical page addresses are associated with logical page addresses.

The page-level map 76 exists in a number corresponding to the number of logical blocks in which effective physical block addresses are held in the page-level management table 75.

FIG. 10 illustrates, as an example, the content of the page-level map 76 with regard to the logical block address $C_1$ shown in FIG. 9.

In a case where data exists in a physical block address held in the page-level management table 75, as indicated by X3 in FIG. 10, the physical block address and the physical page address in which the data of the logical page address is written are held.

On the other hand, in a case where data does not exist in the physical block address held in the page-level management table 75, as indicated by X4, an invalid value (0xFFFF) is held in the physical block address and the physical page address corresponding to the logical page address.

FIG. 11 illustrates the data structure of the sequential writing block management table 77.

The sequential writing block management table 77 serves as management information to be newly added for the purpose of realizing sequential writing as an embodiment.

As shown in FIG. 11, the sequential writing block management table 77 is information in which physical block addresses and final writing logical page addresses are associated with logical block addresses.

It is possible for the sequential writing block management table 77 to store "e" addresses that are determined in advance as logical block addresses. In other words, the number of physical blocks (sequential writing management blocks 50) that can be used for sequential writing is limited to "e".

Here, in a case where the number of physical blocks used with regard to sequential writing has reached the upper limit value, garbage collection for sequential writing blocks, which will be described later, is made to occur, so that usable physical blocks are newly secured.

In FIG. 11, for example, as indicated by X5, in the logical block address at which the physical block (sequential writing management block 50) has been assigned, the physical block address of the assigned physical block is stored. In addition, in the sequential writing, in a case where writing up to a halfway logical page in the relevant logical block has been performed, the value of the logical address of the page data, at which writing has been performed finally, within the data of the logical block, is associated as the value of the final writing logical page address.

On the other hand, X6 in FIG. 11 indicates the content of the logical block address (the address of the logical block in which all the data has been written in sequential writing) to which a physical block has not been assigned, and the physical block address and the final writing logical page address, which are associated with the logical block address. In this case, invalid data (0xFFFF) is held for all the values of the logical block address, the physical block address, and the final writing logical page address.

As described above, the logical block whose data has all been written in sequential writing is excluded from the management using the sequential writing block management table 77. Furthermore, at the same time, the holding of the above-mentioned invalid data (0xFFFF) represents that a usable block exists in the sequential writing block management table 77 (that is, the usable block that can be used in sequential writing has a vacancy).

FIG. 12 illustrates the data structure of the invalid data block management table 78.

The invalid data block management table 78 is management information for identifying a data erasable block from among the physical blocks in which data has been written, the physical block being one of the block-level management block 30, the page-level management block 40, and the sequential writing management block 50.

In the invalid data block management table 78, for example, the physical block address of the physical block in which data erasure is made possible as a consequence of the occurrence of garbage collection is held as appropriate. X7 in FIG. 12 indicates the physical block address of an erasable block.

On the other hand, regarding the physical block in which data has been erased actually because it is erasable, as indicated by X8, the physical page address of the block is updated to an invalid value (0xFFFF). As a result, erroneous erasure for a block which has already been erased (that is, a block having a probability of being newly written with data) is prevented.

1-3. Memory Control Technique in First Embodiment

A description will be given, with reference to FIGS. 13 to 25, of a memory control technique in the first embodiment.

Initially, an example of writing instruction performed on a flash memory device 1 side from a host device 5 side will be given with reference to FIG. 13.

Figure 13:
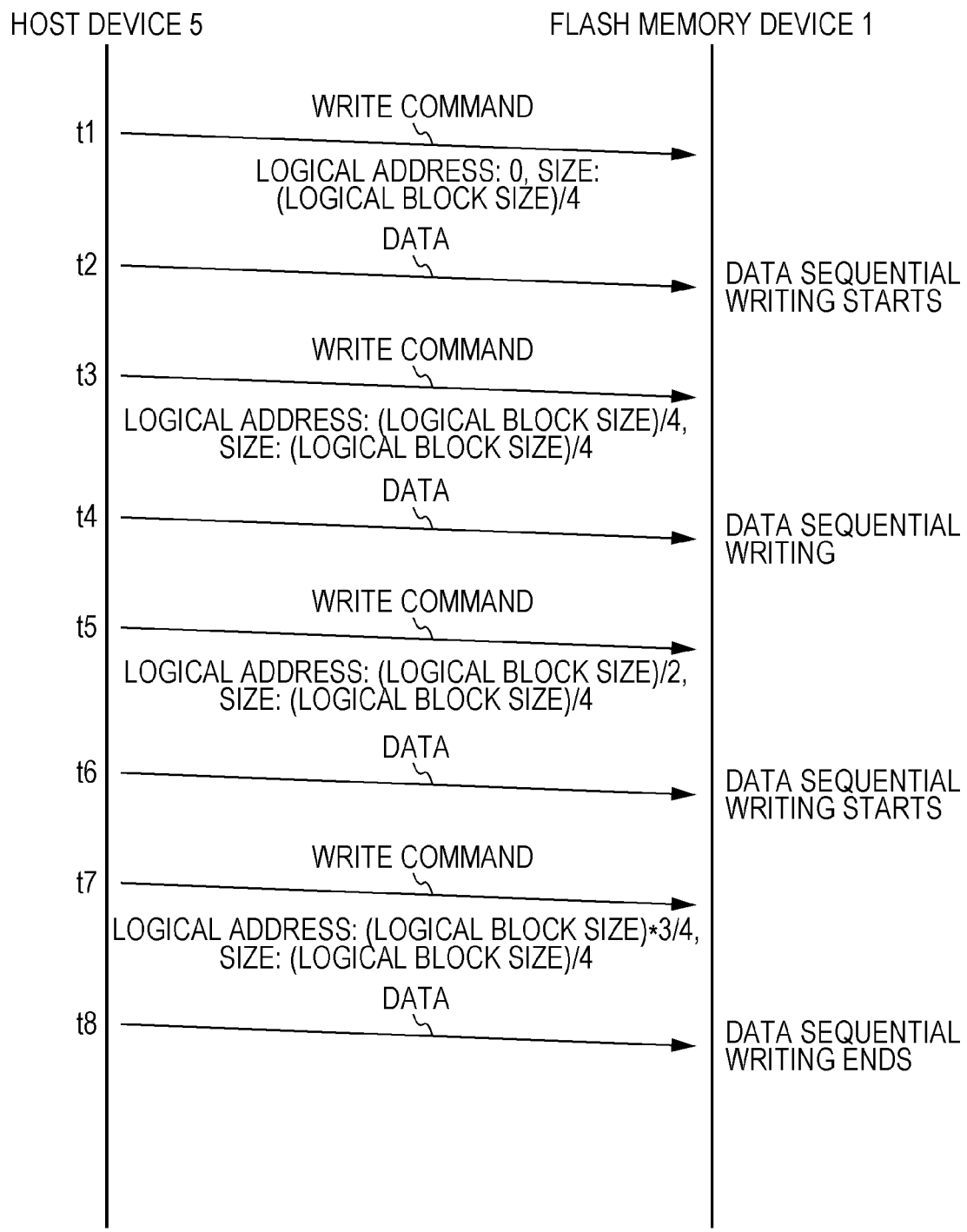
FIG. 13 illustrates an example of writing instruction, which is performed on a flash memory device side from a host device side.

In FIG. 13, a case in which write commands are issued a total of four times at times t1, t3, t5, and t7 in FIG. 13 is shown as an example. Following each write command, data to be written to the flash memory device 1 is sent at times t2, t4, t6, and t8.

In this case, in each write command, a data size of logical block size/4 is designated as a writing data size. Therefore, writing instruction for the amount of one logical block size has been performed in total. In each write command, the writing data size of logical block size/4 is designated. Consequently, the value of the logical address of the writing start, which is designated together with each write command, becomes 0 at time t1, logical block size/4 at time t3, logical block size/2 at time t5, and logical block size *3⁄4 at time t7.

A description will be given for confirmation. FIG. 13 only illustrates an example of the scheme of writing instruction. Of course, actual writing instruction may be performed individually on the data of a different logical block, and the writing data size designated in one write command may be different from that described above.

For example, in a case where writing instruction from the host device 5 side in accordance with a scheme shown in FIG. 13 is performed, specifically, writing instruction is continuously performed in the order of logical addresses on each data belonging to a certain logical block, and writing instruction in which the size of each data is greater than or equal to a predetermined size is performed, in the flash memory device 1 of the present embodiment, data writing as sequential writing is performed in such a manner as to correspond to each write command.

A description will be given below of a memory control technique in the first embodiment, including a sequential writing process.

Figure 14:
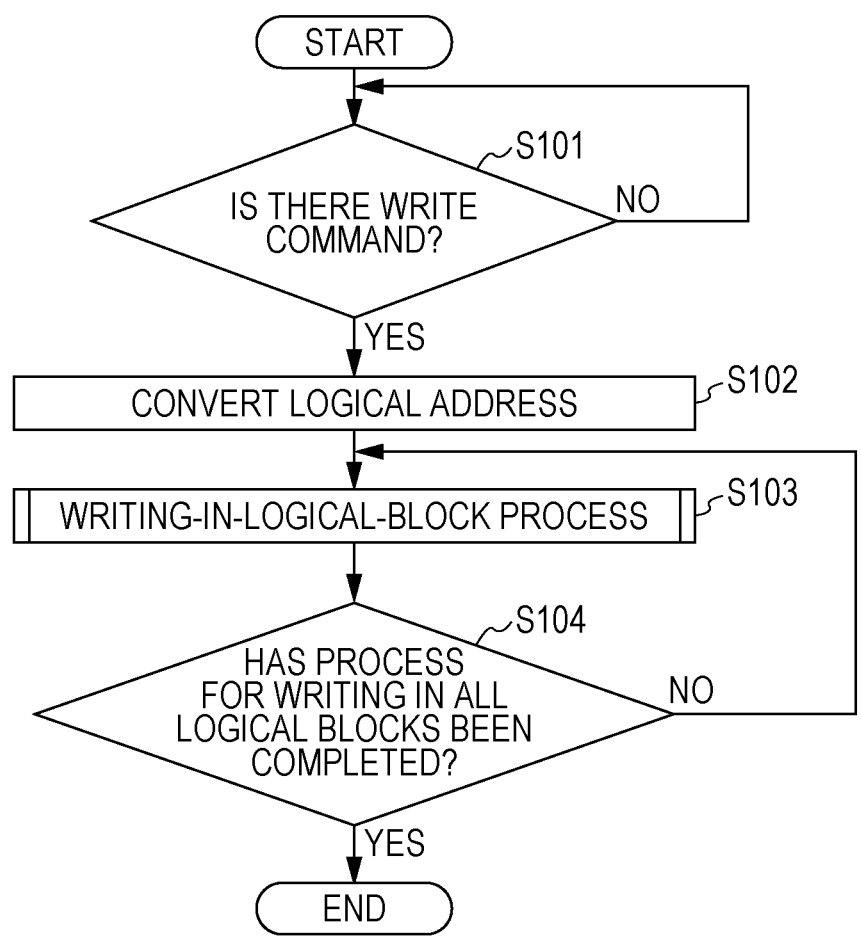
FIG. 14 is a flowchart of a write command execution process.

First, FIG. 14 is a flowchart of a write command execution process.

Processing operations shown in the flowcharts shown in FIGS. 15, 16 and 21, which will be described later, including FIG. 14, are performed in accordance with programs stored in, for example, the ROM described above or the like, which is provided in the memory controller 3 shown in FIG. 1.

In FIG. 14, in step S101, the memory controller 3 waits for a write command from the host device 5 side.

Then, in a case where a write command from the host device 5 side occurs, in step S102, the memory controller 3 performs a logical address conversion process. In the logical address conversion process, the logical block address, the logical page address, and the logical sector address at which writing is performed are each calculated on the basis of the logical address and the data size that are designated by the host device 5.

Here, in the flash memory, in a case where writing-instructed data size is larger than the logical block size, the data writing process is performed individually for each logical block in sequence from the logical block address at which writing starts to the final logical block address.

After the logical address conversion process is performed in step S102, in step S103, a writing-in-logical-block process is performed.

In the writing-in-logical-block process, a writing process for each logical block is performed.

Specific processing content to be performed as the writing-in-logical-block process in step S103 will be described later with reference to FIG. 15 (and FIGS. 16 and 21).

After the execution of the writing-in-logical-block process in step S103, it is determined in step S104 whether or not all the writing-in-logical-block processes are completed. That is, it is determined whether or not the writing-in-logical-block processes are completed at all the logical block addresses for which writing has been performed in the logical address conversion process in step S102.

When a negative result that the writing process has not yet been completed at all the logical block addresses and all the writing-in-logical-block processes have not been completed is obtained in step S104, the process returns to step S103. That is, the writing process in step S103 is performed until the writing process is completed at all the logical block addresses for the object of writing.

On the other hand, when an affirmative result that the writing process has been completed at all the logical block addresses and all the writing-in-logical-block processes have been completed is obtained in step S104, the write command execution process shown in FIG. 14 is completed.

Figure 15:
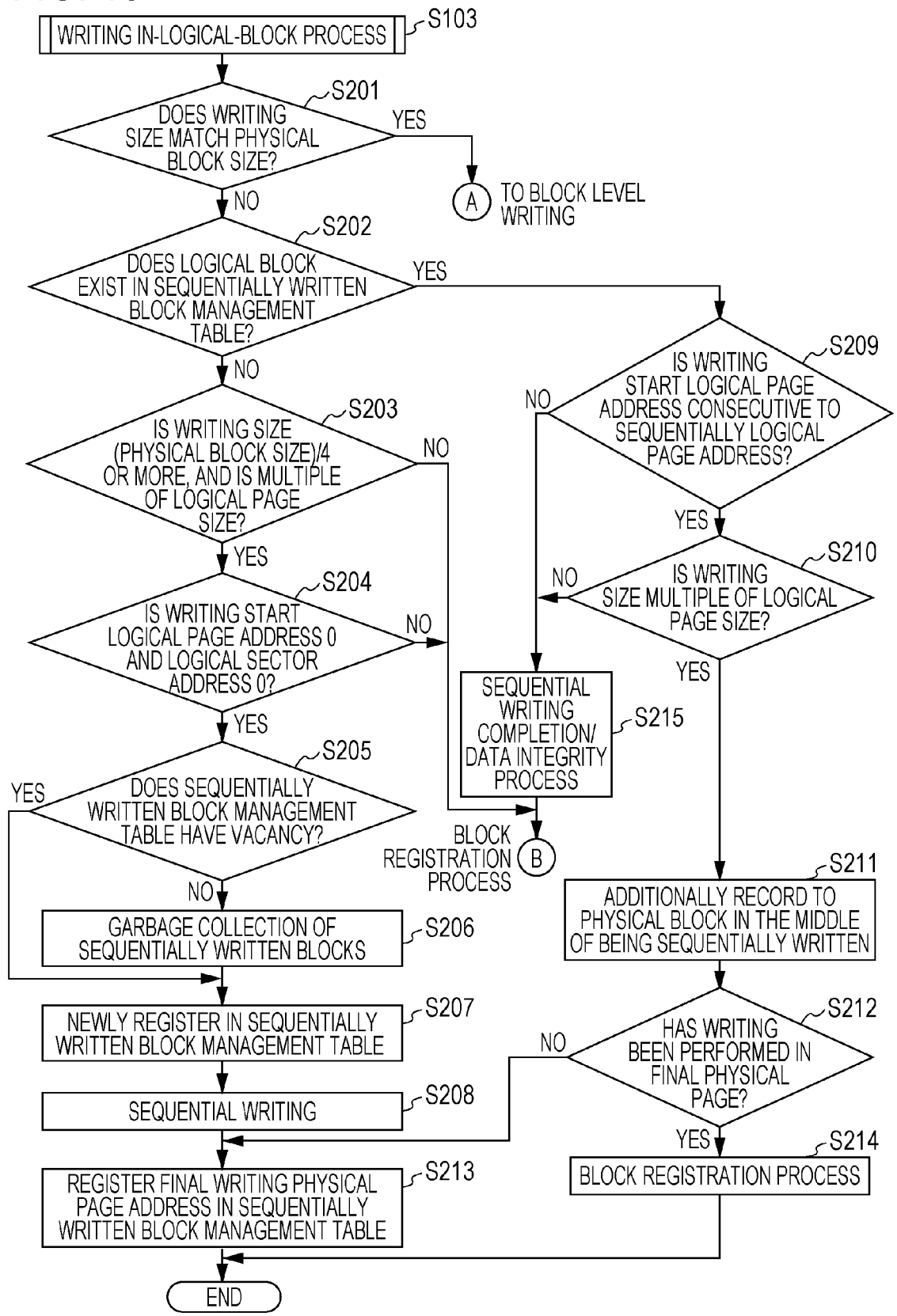
FIG. 15 is a flowchart illustrating specific processing content to be performed as a writing-in-logical-block process (S103) shown in FIG. 14.

FIG. 15 is a flowchart illustrating specific processing content to be performed as a writing-in-logical-block process (S103) shown in FIG. 14.

First, in step S201, it is determined whether or not the writing size matches the physical block size. That is, it is determined whether or not the size of the data to be written in the writing-at-logical-address process in step S103 matches the physical block size.

The determination process of step S201 can also be described as being a process for determining whether or not the writing size is less than the physical block size.

Figure 16:
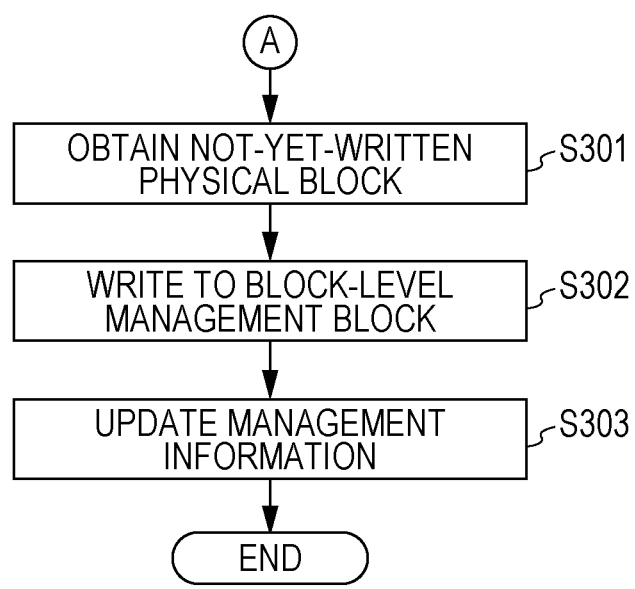
FIG. 16 is a flowchart illustrating processing content for block level writing.

When an affirmative result that the writing size matches the physical block size is obtained in step S201, the process proceeds to step S301 shown in FIG. 16. That is, a process for block level writing is performed.

Here, a description will be given, with reference to FIG. 16, of a process for block level writing.

In FIG. 16, in step S301, a process for obtaining a not yet written physical block is performed. That is, one arbitrary physical block address is obtained from among the physical block addresses that are managed as not yet written physical blocks with regard to the flash memory 4.

After the execution of the process for obtaining a not yet written physical block in step S301, in step S302, a block-level management block writing process is performed. That is, the data received from the host device 5 side is written to the physical block of the address obtained in step S301.

After the execution of the writing process in step S302, in step S303, a management information update process is performed. That is, the value of the physical block address obtained in step S301 is written as the value of the physical block address assigned to the logical block address for the object of the relevant writing-in-logical-block process in the block-level management table 70.

After the execution of the management information update process in step S303, the writing-in-logical-block process in step S103 is completed.

In a case where the writing of the block data performed in the writing-in-logical-block process is involved with overwriting in a logical level, there is a case in which not only an update process for the block-level management table 70 such as that described above, but also the update of the other management information, such as the page-level management table 75, the page-level map 76, and the invalid data block management table 78, should be performed.

For example, regarding the data of the logical block for the object of the writing-in-logical-block process, in the case that old data before overwriting is in a state of having been written in a physical block (set as a physical block $b_0$) under the block-level management, when the data of the relevant logical block has been newly written in the writing of step S302, the physical block $b_0$ in which the old data has been recorded should be handled as being erasable. Therefore, in this case, a process for adding the physical block address of the relevant physical block $b_0$ to the invalid data block management table 78 should be performed together.

Alternatively, in the case that part or the whole of the above-mentioned old data was written in respective different physical blocks by page level writing in the past in a distributed manner, those data should be invalidated through the execution of the writing (that is, the physical level writing for overwriting in a logical level) in step S302 above. Therefore, in this case, an update process of writing an invalid value (0xFFFF) to the page-level management table 75 and the page-level map 76 should be performed with regard to those data to be invalidated.

Referring back to FIG. 15, a description will be given.

When, in earlier step S201, a negative result is obtained because the writing size does not match the physical block size, the process proceeds to step S202, where it is determined whether or not a logical block exists in the sequential writing block management table 77. That is, it is determined whether or not the logical block address of the logical block (that is, the logical block for the object of the relevant writing-in-logical-block process) in which writing has been performed exists in the sequential writing block management table 77.

Here, in the case that the address value of the logical block in which writing has been performed exists in the sequential writing block management table 77, the data of the relevant logical block is in the middle of being sequentially written.

On the other hand, in the case that the address value of the logical block in which writing has been performed does not exist in the sequential writing block management table 77, the relevant logical block is at least not a block in the middle of being sequentially written.

As is also seen by considering this point, the determination process of step S202 above can be regarded as determining whether or not the data in the logical block address to which the sequentially written data belongs was sequentially written in the past.

When, in step S202, a negative result is obtained because a logical block does not exist in the sequential writing block management table 77, the process proceeds to step S203.

Processes of steps S203 and S204 are processes for making a determination as to whether or not the sequential writing management block 50 should be newly registered and data to be written in the relevant writing-in-logical-block process should be written therein.

In step S203, it is determined whether or not the writing size is greater than or equal to (physical block size)/4 and is a multiple of the logical page size.

In other words, it is determined whether or not the writing size is a size suitable for sequential writing.

Here, the upper limit of the size suitable for sequential writing differs depending on, for example, the set block size or the like, and should not necessarily be limited to "(physical block size)/4 or more". In the case of this example, it is assumed that the size is set to (physical block size)/4 or more in correspondence with the block size=32 MB (mega bytes).

When, in step S203, a negative result is obtained because the condition in which the writing size is greater than or equal to (physical block size)/4 and is a multiple of the logical page size is not satisfied, the process proceeds to step S401 shown in FIG. 21 later. That is, the process proceeds to a process for page level writing.

On the other hand, when, in step S203, an affirmative result that the writing size is greater than or equal to (physical block size)/4 and is a multiple of the logical page size is obtained, the process proceeds to step S204, where it is determined whether or not the writing start logical page address is 0 and the logical sector address is 0. That is, it is determined whether or not the writing start address of the data matches the beginning address of the logical block for the object of the relevant writing-in-logical-block process.

Figure 21:
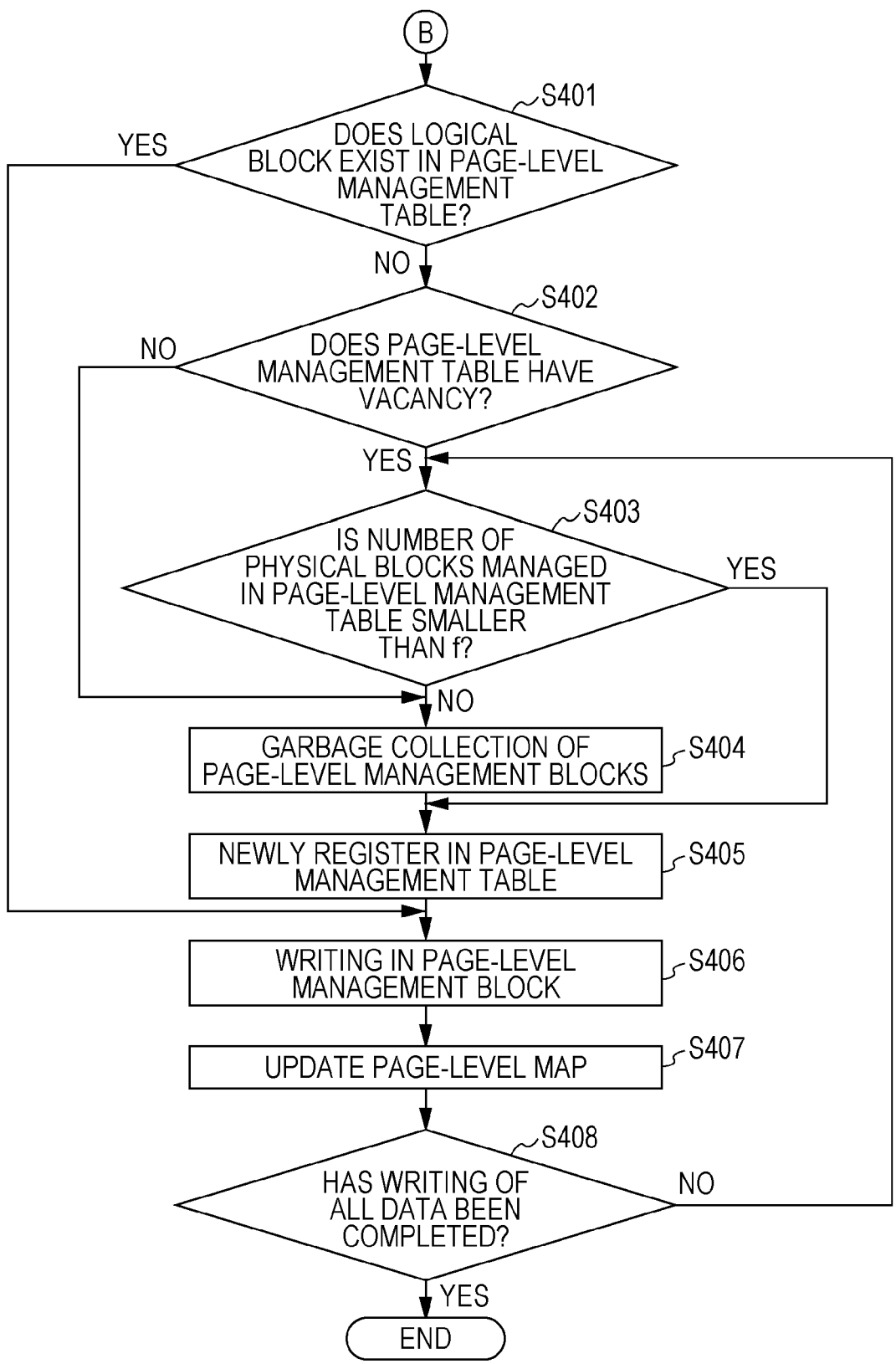
FIG. 21 is a flowchart illustrating processing content for page level writing.

When, in step S204, a negative result is obtained because the conditions in which the writing start logical page address is 0 and the logical sector address is 0 are not satisfied, the process proceeds to a process for page level writing shown in FIG. 21.

On the other hand, when, in step S204, an affirmative result is obtained because the writing start logical page address is 0 and the logical sector address is 0, the process proceeds to step S205.

In step S205, it is determined whether or not the sequential writing block management table 77 has a vacancy. That is, it is determined whether or not the number of blocks that can be used as the sequential writing block 50 has reached the upper limit.

When, in step S205, an affirmative result is obtained because the sequential writing block management table 77 has a vacancy, the process proceeds to step S207, where new registration is performed in the sequential writing block management table 77. That is, the logical block address (the address of the logical block for the object in the relevant writing-in-logical-address process), and the physical block address of the block used as the sequential writing block 50 are newly added to the sequential writing block management table 77, and a new sequential writing block 50 is registered.

In the case of new registration, for the value of the final writing logical page address in the sequential writing block management table 77, for example, an initial value (0xFFFF) is written.

When, in step S205, a negative result is obtained because the sequential writing block management table 77 has no vacancy, the process proceeds to step S206, where after garbage collection of the sequential writing blocks is performed (that is, after physical blocks that can be used as the sequential writing management blocks 50 are secured), the new registration process of step S207 above is performed.

Here, as a process of "garbage collection of the sequential writing blocks" in step S206, first, one logical block is selected from among the logical blocks that are managed using the sequential writing block management table 77. Hereinafter, the address of the logical block that is selected in this manner is set as "$a_i$".

Garbage collection is performed in the logical block $a_i$ that has been selected as described above, and the management for the data of the relevant logical block $a_i$ is upgraded to the block-level management. Thus, the sequential writing block management table 77 has a vacancy.

At this time, as the garbage collection of the sequential writing blocks, a different process is performed depending on 1) when the recorded data of the logical block $a_i$ that has been selected in the manner described above is distributed to other blocks and recorded (that is, as the recorded data of the logical block $a_i$, in addition to the data under the management of the sequential writing block management table 77, data under page-level management and block-level management exists), and 2) when the recorded data of the logical block $a_i$ does not exist at all in other blocks (when the recorded data of the logical block $a_i$ is only the data under the management of the sequential writing block management table 77).

A specific example of garbage collection of sequential writing blocks, which is performed in correspondence with the case of the above-mentioned 1), will be described with reference to FIGS. 17 to 19.

Figure 17:
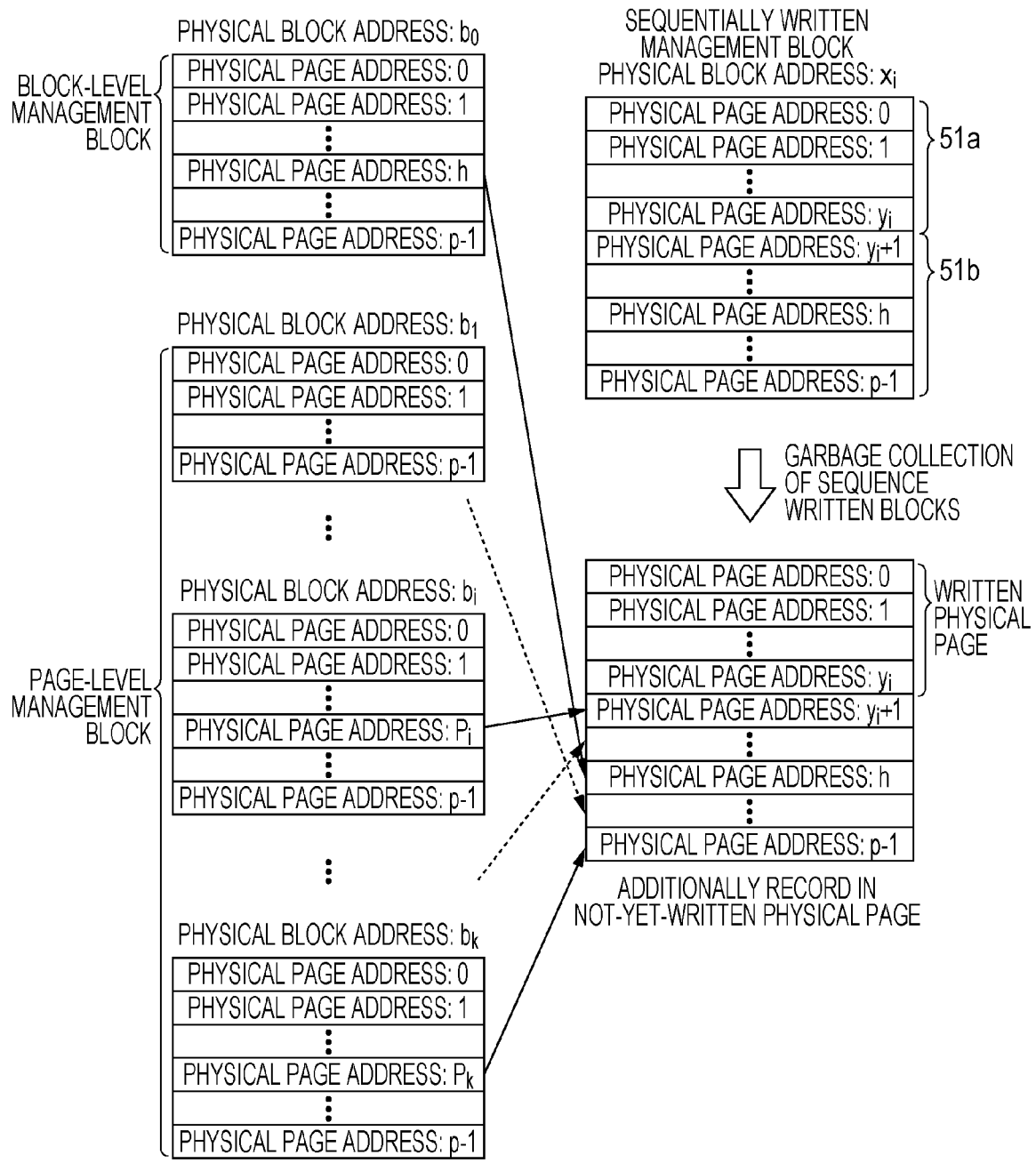
FIG. 17 schematically illustrates an example of a state of the shift of data at a physical level by garbage collection of sequential writing blocks.

FIG. 17 schematically illustrates an example of the state of the shift of data in a physical level by the garbage collection of the sequential writing blocks in the case of 1). FIG. 18 illustrates, as an example, the content of the sequential writing block management table 77, the block-level management table 70, the page-level management table 75, and the page-level map 76 before the data shift shown in FIG. 17.

Figure 19:
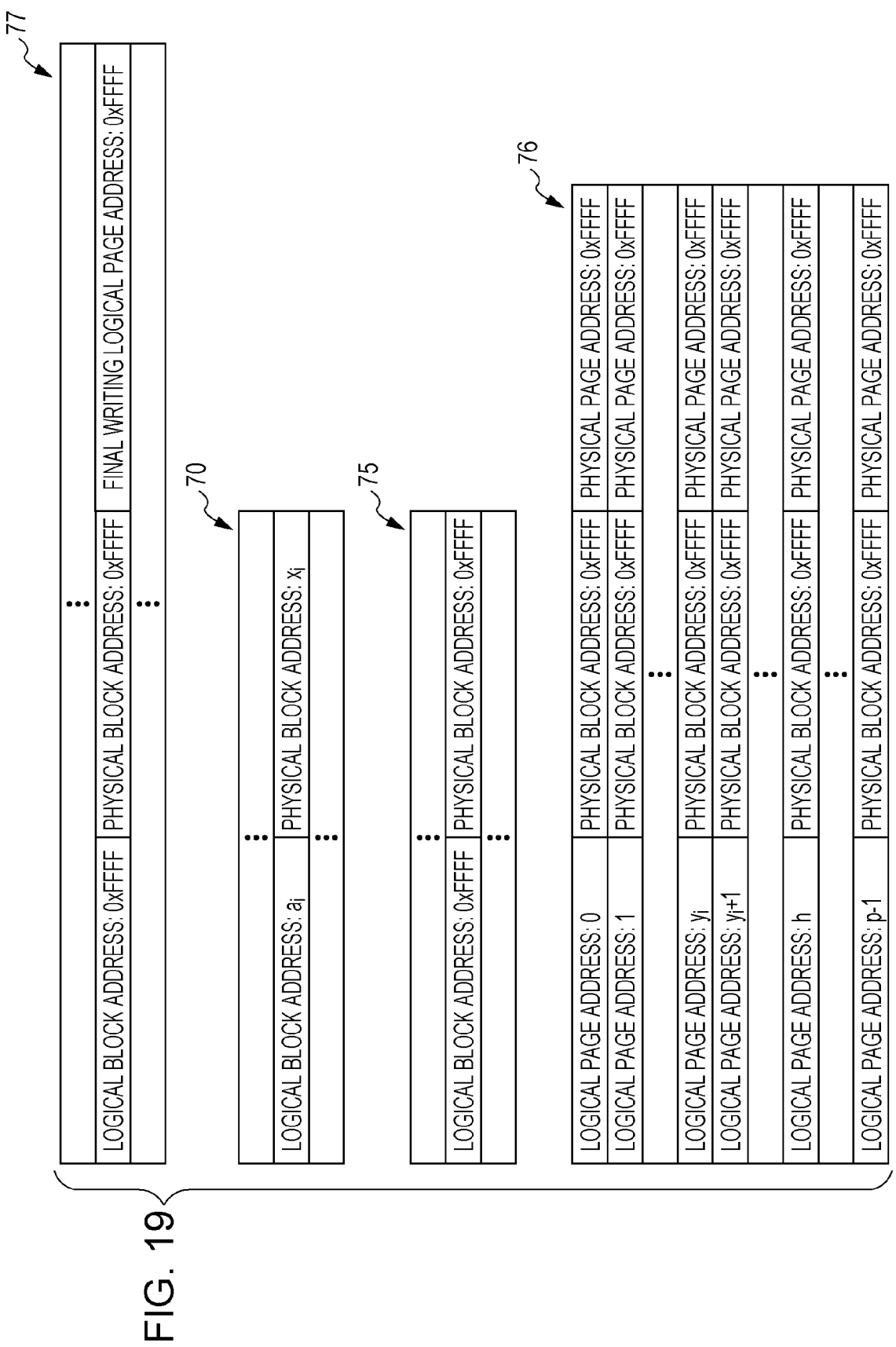
FIG. 19 illustrates, as an example, the content of a sequential writing block management table, a block-level management table, a page-level management table, and a page-level map after the data shift shown in FIG. 17.

FIG. 19 illustrates, as an example, the content of the sequential writing block management table 77, the block-level management table 70, the page-level management table 75, and the page-level map 76 after the data shift shown in FIG. 17.

After one logical block address ($a_i$) is selected from the sequential writing block management table 77 in the manner described above, by referring to the block-level management table 70, the page-level management table 75, and the page-level map 76, as shown in FIG. 17, the logical page data of the relevant logical block address $a_i$, which is distributed to the other physical blocks, is gathered and additionally recorded with respect to the not yet written physical page 51$a$ of the physical block address ($x_i$ in this case) that is assigned to the logical block address $a_i$ in the sequential writing block management table 77.

Then, after the data shift process in the physical level related to such garbage collection is performed, each management information is updated as shown in FIG. 19.

Specifically, regarding the sequential writing block management table 77, all the value of the logical block address to which the logical block address $a_i$ has been assigned, the value of the physical block address, and the value of the final writing logical page address are updated to an invalid value (0xFFFF).

Furthermore, regarding the block-level management table 70, the physical block address that has been assigned to the logical block address $a_i$ is updated to $x_i$.

In addition, regarding the page-level management table 75, all the value of the logical block address to which the logical block address $a_i$ has been assigned, and the value of the physical block address are updated to an invalid value (0xFFFF).

Furthermore, all the values of the physical block address and the physical page address of the page-level map 76 used for the logical block address $a_i$ are updated to an invalid value (0xFFFF).

As a result of such garbage collection, the physical block of the address $x_i$ that has been assigned to the selected logical block address $a_i$ is newly placed under the block level management. Thus, it is possible to increase by one the number of vacancies of the physical block that can be used in the sequential writing block management table 77.

Figure 18:
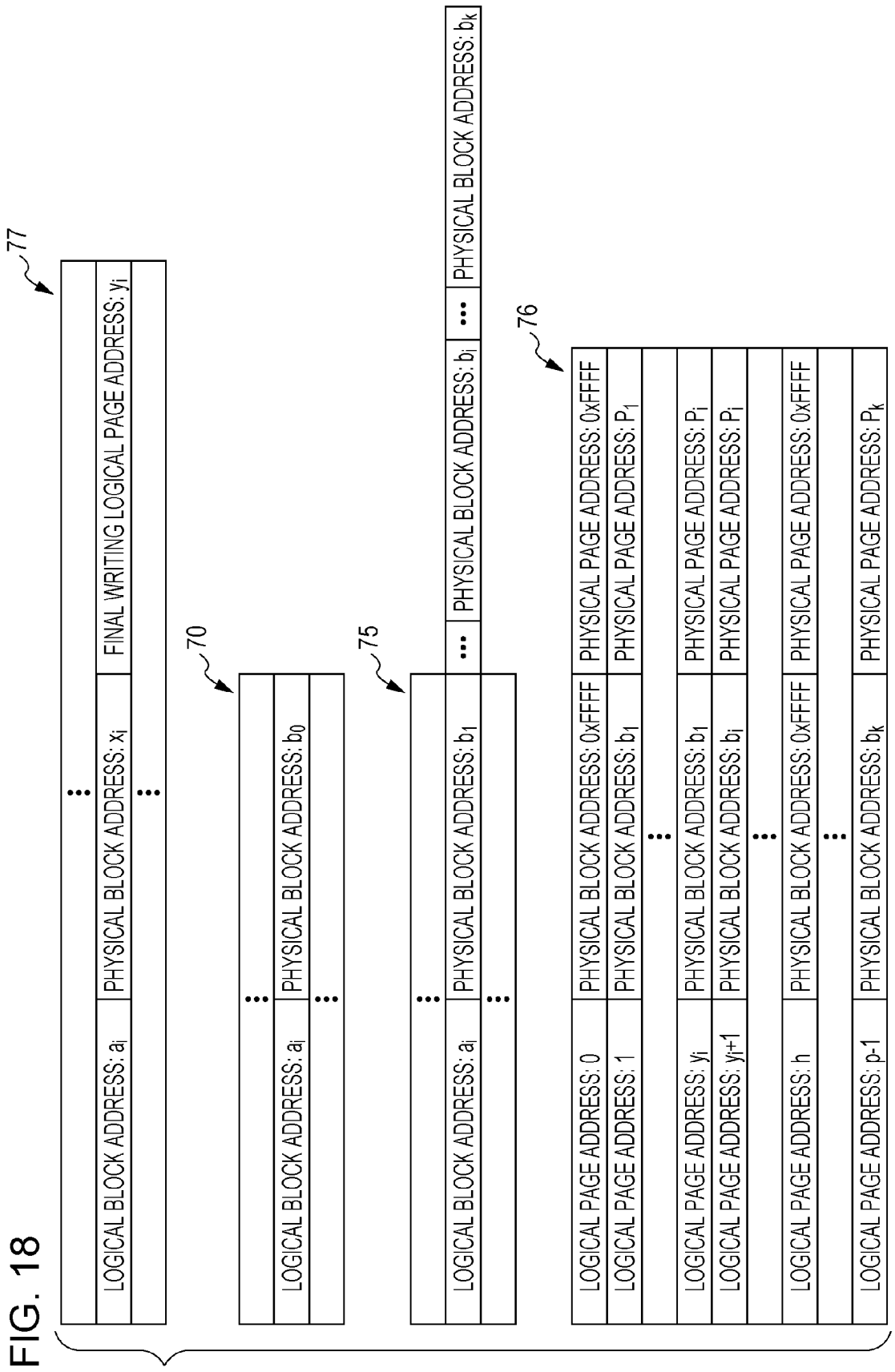
FIG. 18 illustrates, as an example, the content of a sequential writing block management table, a block-level management table, a page-level management table, and a page-level map before the data shift shown in FIG. 17.

As in the examples shown in FIGS. 17 and 18, in a case where the old data of the logical block $a_i$ has been written to a certain physical block (a physical block address $b_0$ in the example of FIGS. 17 and 18) and this data has been placed under the block-level management, as a consequence of the execution of the garbage collection of the sequential writing blocks, the physical block of the relevant physical block address $b_0$ should be handled as being erasable. For this reason, in the case of the examples shown in FIGS. 17 and 18, at the time of the garbage collection of the sequential writing blocks, a process for registering the relevant physical block address $b_0$ to the invalid data block management table 78 is also performed.

On the other hand, the garbage collection of the sequential writing blocks in the case of the above-mentioned 2) is common to the case of 1) in that, first, one logical block address ($a_i$) is selected from the sequential writing block management table 77.

In the case of the above-mentioned 2), after the logical block address $a_i$ is selected as described above, for example, dummy data, such as an initial value, is written to the not yet written physical page 51$b$ of the physical block ($x_i$) that has been assigned to the relevant logical block address $a_i$ in the sequential writing block management table 77, so that the entire block is written with data.

Moreover, in the sequential writing block management table 77, all the value of the logical block address to which the logical block address $a_i$ has been assigned, the value of the physical block address, and the value of the final writing logical page address are updated to an invalid value (0xFFFF). Furthermore, in the block-level management table 70, the logical block address $a_i$ and the physical block address $x_i$ in association with the logical block address $a_i$ are newly written. Consequently, the relevant physical block $x_i$ is newly placed under the block level management. As a result, it is possible to generate a new vacant block in the sequential writing block management table 77 in correspondence with the case of the above-mentioned 2).

Here, as is understood from the above description, the gist of the "garbage collection of the sequential writing blocks"

lies in that, by newly placing a certain sequential writing management block 50 selected from the sequential writing block management table 77 under the block-level management, a vacancy is secured in the sequential writing block management table 77.

Referring back to FIG. 15, a description will be given.

In FIG. 15, after the new registration process for the sequential writing block 77 in step S207 is performed, a sequential writing process is performed in step S208. That is, writing is performed in the order of addresses in the physical block that has been newly registered in step S207.

FIG. 20A illustrates a conceptual view of sequential writing in this case.

As described above, in the sequential writing of the present example, in a physical block (set as an address $b_j$ in FIG. 20A), data received from the host device 5 is written in order starting from the physical page address 0 and the physical sector address 0. At this time, the unit of writing is a logical page size.

In FIG. 15, after the execution of the sequential writing process in step S208, in step S213, the final writing physical page address is registered in the sequential writing block management table 77. That is, as the value of the final writing logical page address that is associated with the logical block address, at which the sequential writing was performed in step S207, from among the logical block addresses that are registered in the sequential writing block management table 77, the value of the logical page address at which the final writing was performed is written.

FIG. 20B illustrates, as an example, the content of the sequential writing block management table 77 after the registration process in step S213.

For example, if, with regard to the data of the logical block address $a_j$, sequential writing up to the logical page address $P_k$ is performed in the block of the physical block address $b_j$, in the sequential writing block management table 77 in that case, as shown in FIG. 20B, a logical page address $P_k$ is written as the final writing logical page address that is associated with the logical block address $a_j$ and the physical block address $b_j$.

In FIG. 15, after the execution of the registration process in step S213, the writing-in-logical-block process (S103) is completed.

Next, a description will be given of a process to be performed in correspondence with the case that an affirmative result is obtained in the determination process of earlier step S202 because a logical block exists in the sequential writing block management table 77, that is, the case that sequential writing is in the middle of being performed.

In FIG. 15, when an affirmative result is obtained in the determination process of step S202, the process proceeds to step S209.

In step S209, it is determined whether or not the writing start logical page address is consecutive to the sequence logical page address. That is, it is determined whether or not the writing start logical page address is consecutive to the final writing logical page address with regard to the logical block address for the object of the relevant writing-in-logical-block process, which is managed using the sequential writing block management table 77, and whether or not the writing start logical sector address is 0.

For example, a description will be given with reference to the content of the sequential writing block management table 77 shown in FIG. 20B. In this case, if, with regard to the logical block address $a_j$ at which writing is being performed, the value of the writing start logical page address is $(p_k+1)$ and the offset in the logical page is 0, a determination result that the writing start logical page address is consecutive to the sequence logical page address is obtained.

When, in step S209, a negative result is obtained because the writing start logical page address is not consecutive to sequence logical page address, the process proceeds to step S215, where a sequential writing completion and data integrity process is performed, and thereafter, the process shifts to a process (to be described later) for page level writing shown in FIG. 21.

Here, the sequential writing completion and data integrity process of step S215 is a process for upgrading the management for the data of the relevant logical block to the block-level management and for ending the sequential writing by performing garbage collection of blocks in the middle of being sequentially written, as a logical block for the object of the relevant writing-in-logical-block process, which is managed in the sequential writing block management table 77. That is, the above process may be mentioned to be a process for ensuring the compatibility of the data before the shift to the page level writing shown in FIG. 21.

As the specific processing content of the sequential writing completion and data integrity process in step S215, a different process is performed depending on 3) when the recorded data of the logical block (provisionally set as "$T_i$") for the object of the relevant writing-in-logical-block process is distributed to other blocks and recorded (that is, as the recorded data of the logical block $T_i$, in addition to the data under the management of the sequential writing block management table 77, data under page-level management and under block-level management exists), and 4) when the recorded data of the logical block does not exist at all in the other blocks (when the recorded data of the logical block $T_i$ is only data under the management of the sequential writing block management table 77).

Here, in the case of the above-mentioned 3), the logical block $T_i$ is replaced with the logical block $a_i$, and processing similar to the earlier process corresponding to the case of 1) described with reference to FIGS. 17 to 19 is performed, so that the management for the data of the logical block $T_i$ is upgraded to the block-level management.

On the other hand, in the case of the above-mentioned 4), similarly, the logical block $T_i$ is replaced with the logical block $a_i$, and processing similar to the case of the earlier 2) is performed, so that the management for the data of the logical block $T_i$ is upgraded to the block-level management.

On the other hand, when, in step S209, an affirmative result that the writing start logical page address is consecutive to the sequence logical page address is obtained, the process proceeds to step S210, where it is determined whether or not the writing size is a multiple of the logical page.

Here, in a NAND flash memory, since the unit of the reading/writing of data is a page size, when the writing size is not a multiple of the page size (that is, the case of a size less than the page or a size at which a fraction less than the page size is output), the data is not suitable for sequential writing.

For this reason, when, in step S210, a negative result is obtained because the writing size is not a multiple of the logical page, the process proceeds to step S215 above, where a sequential writing completion and data integrity process is performed, and then the process shifts to a process for page level writing shown in FIG. 21.

On the other hand, when, in step S210, an affirmative result is obtained because the writing size is a multiple of the logical page, the process proceeds to step S211, where data is additionally recorded to the physical block in the middle of being sequentially written. That is, the value of the physical block address that is assigned to the logical block in which writing has been performed and the value of the final writing logical page address are obtained from the sequential writing block management table 77, and data is written in order starting from the beginning page from among the not yet written physical pages in the physical block of the obtained address.

A description will be given by using, for example, the content of the sequential writing block management table 77 of FIG. 20B. In this case, the writing start logical page address is $p_k+1$, and data at the specified size is written in order starting from the physical page corresponding to the relevant logical page address $p_k+1$.

After the execution of the data additional recording process in step S211, in step S212, it is determined whether or not writing has been performed at the final physical page. That is, this is equivalent to that a determination is made as to whether or not data has been written in all the physical pages in the sequential writing block 50 that has been assigned to the logical block in which writing has been performed.

When, in step S212, a negative result is obtained because the writing is not to the final physical page, the process proceeds to step S213 earlier, where the final writing physical page address is registered in the sequential writing block management table 77.

On the other hand, when, in step S212, an affirmative result is obtained because the writing was to the final physical page, the process proceeds to step S214, where a block registration process is performed. That is, this is a process for newly placing the block for which the writing of all the pages is completed from being under the sequential writing management to the block level management.

Specifically, if the address of the logical block (that is, the logical block for the object of the relevant writing-in-logical-block process) for which all the pages have been completely written is denoted as $a_i$ and the address of the physical block that has been assigned to the relevant logical block $a_i$ in the sequential writing block management table 77 is denoted as $x_i$, in the registration process of step S214, all the value of the logical block address to which the logical block address $a_i$ has been assigned, the value of the physical block address, and the value of the final writing logical page address in the sequential writing block management table 77 are updated to an invalid value (0xFFFF), and a process for newly writing the logical block address $a_i$, and the physical block address x, in association with the logical block address $a_i$ in the block-level management table 70 is performed.

Here, regarding the block registration process of step S214, 5) in the case that up to the halfway point of the logical block for the object of the relevant writing-in-logical-block process has been written with data, and this time, data is to be newly additionally recorded to the succeeding portion, it is sufficient that only the registration process described above is performed.

6) However, in the case that the physical writing as the additional recording accompanies overwriting in the logical level, a process for handling the old data for the object of the logical overwriting as having been deleted is also performed together with the above-mentioned registration process.

Specifically, the address of the logical block for the object of the relevant writing-in-logical-block process is set as $a_i$ and the address of the physical block that has been assigned to the relevant logical block $a_i$ in the sequential writing block management table 77 is set as $x_i$. All the value of the logical block address and the value of the physical block address, at which the logical block address $a_i$ has been assigned in the page-level management table 75, are updated to an invalid value (0xFFFF). Also, a process for updating the values of the physical block address and the physical page address of the page-level map 76, which are used for the logical block address $a_i$, to an invalid value (0xFFFF) is performed.

After the execution of the registration process of step S214, the writing-in-logical-block process (S103) is completed.

Next, a description will be given, with reference to FIG. 21, of a process for page level writing.

In FIG. 21, initially, in step S401, it is determined whether or not a logical block exists in the page-level management table 75. That is, it is determined whether or not a logical block address for the object of the relevant writing-in-logical-block process exists in the page-level management table 75.

When, in step S401, an affirmative result is obtained because the logical block exists in the page-level management table 75, the process proceeds to step S406 as shown in FIG. 21, where writing to the page-level management block 40 is performed. That is, data having a writable size within the data received from the host device 5 side is written to the page-level management block 40 that has been assigned to the logical block address for the object of the relevant writing-in-logical-block process in the page-level management table 75.

On the other hand, when, in step S401, a negative result that a logical block does not exist in the page-level management table 75 is obtained, the process proceeds to step S402, where it is determined whether or not the page-level management table 75 has a vacancy. Specifically, it is determined whether or not the number of logical blocks that are registered in the page-level management table 75 has reached "d" mentioned above.

When, in step S402, an affirmative result is obtained because the page-level management table 75 has a vacancy, the process proceeds to step S403, where the number of physical blocks that are managed using the page-level management table 75 is smaller than "f". That is, it is determined whether or not the number of physical blocks serving as the page-level management blocks 40 that are currently managed using the page-level management table 75 has reached the upper limit value=f.

In either case when, in step S403, a negative result that the number of physical blocks that are managed using the page-level management table 75 is not smaller than "f" (the upper limit value "f" has been reached) is obtained, and when, in step S402, a negative result that the page-level management table 75 has no vacancy is obtained, the process proceeds to step S404, where garbage collection of the page-level management blocks is performed.

After that, in step S405, new registration is performed in the page-level management table 75. That is, the logical block address for the object of the relevant writing-in-logical-block process is newly registered in the page-level management table 75, so that the page-level management block 40 (physical block) that is assigned to the relevant logical block address is newly secured.

Furthermore, when, in step S403, an affirmative result that the number of physical blocks that can be managed using the page-level management table 75 is smaller than "f", (the upper limit value "f" has not been reached) is obtained, the garbage collection of step S404 is skipped, and the new registration process of step S405 above is performed.

Here, the outline of processing in "the garbage collection of the page-level management blocks" in step S404 will be described with reference to FIGS. 22 to 24.

Figure 22:
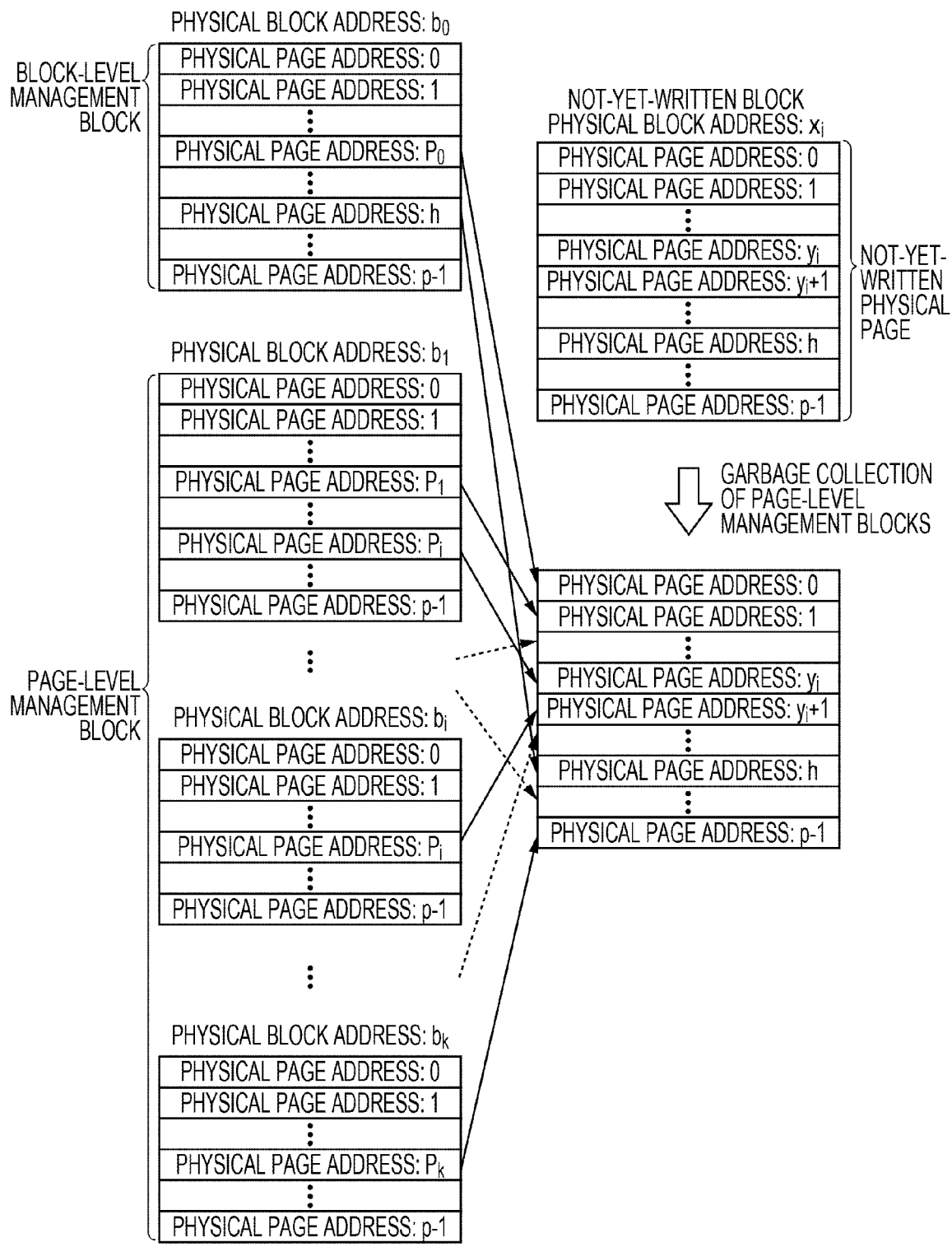
FIG. 22 schematically illustrates an example of a state of the shift of data at a physical level by garbage collection of page-level management blocks.

FIG. 22 schematically illustrates an example of a state of the shift of data in a physical level by garbage collection of the page-level management blocks. FIG. 23 illustrates, as an example, the content of the block-level management table 70, the page-level management table 75, and the page-level map 76 before the data shift shown in FIG. 22.

Figure 24:
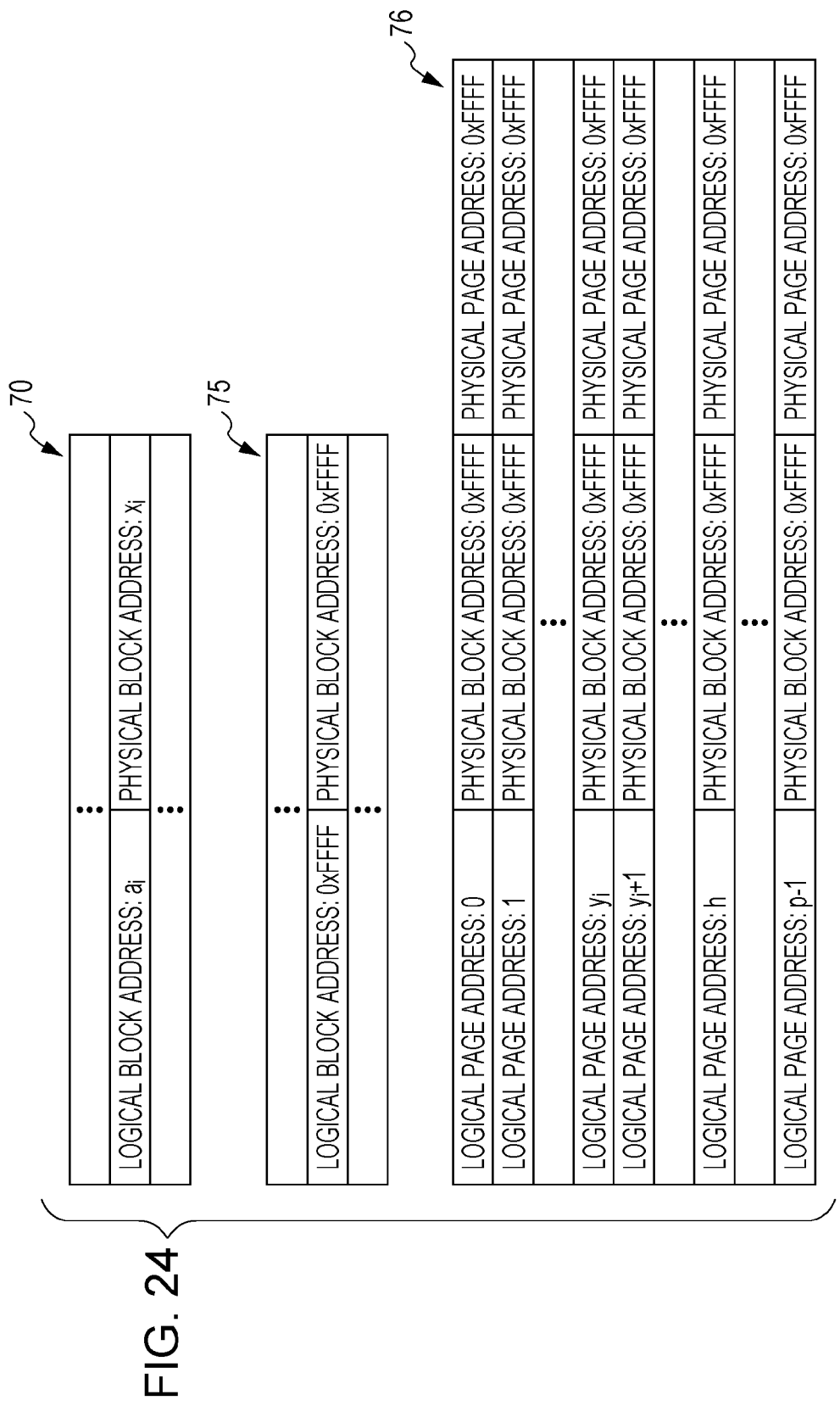
FIG. 24 illustrates, as an example, the content of a block-level management table, a page-level management table, and a page-level map after the data shift shown in FIG. 22.

FIG. 24 illustrates, as an example, the content of the block-level management table 70, the page-level management table 75, and the page-level map 76 after the data shift shown in FIG. 22.

First, in the garbage collection of page-level management blocks, one logical block address is selected from among the logical block addresses that are managed using the page-level management table 75 and also, one physical block address among the not yet written physical blocks is obtained. In the example of this case, it is assumed that, for the logical block address, the logical block address $a_i$ in FIG. 23 is selected. Furthermore, the physical block address of the selected not yet written physical block is set as $x_i$.

After the logical block address $a_i$ and the not yet written physical block address $x_i$ are selected as described above, by referring to the block-level management table 70, the page-level management table 75, and the page-level map 76, as shown in FIG. 22, the logical page data of the logical block address $a_i$, which is distributed to other physical blocks, is gathered and written to the not yet written physical page of the physical block address $x_i$.

After the execution of the data shift process in such a physical level, the update of each management information shown in FIG. 24 is performed.

Specifically, regarding the block-level management table 70, the physical block address that is assigned to the logical block address $a_i$ is updated to $x_i$. That is, as a result, the logical block $a_i$ is newly placed under the block level management.

Moreover, regarding the page-level management table 75, all the value of logical block address and the value of the physical block address, to which the logical block address $a_i$ has been assigned, are updated to an invalid value (0xFFFF). Furthermore, all the values of the physical block address and the physical page address of the page-level map 76, which are used for the logical block address $a_i$, are updated to an invalid value (0xFFFF). As a result of these processes, the distributed old page data of the logical block $a_i$ is invalidated and also, a new vacancy block is secured in the page-level management table 75.

Figure 23:
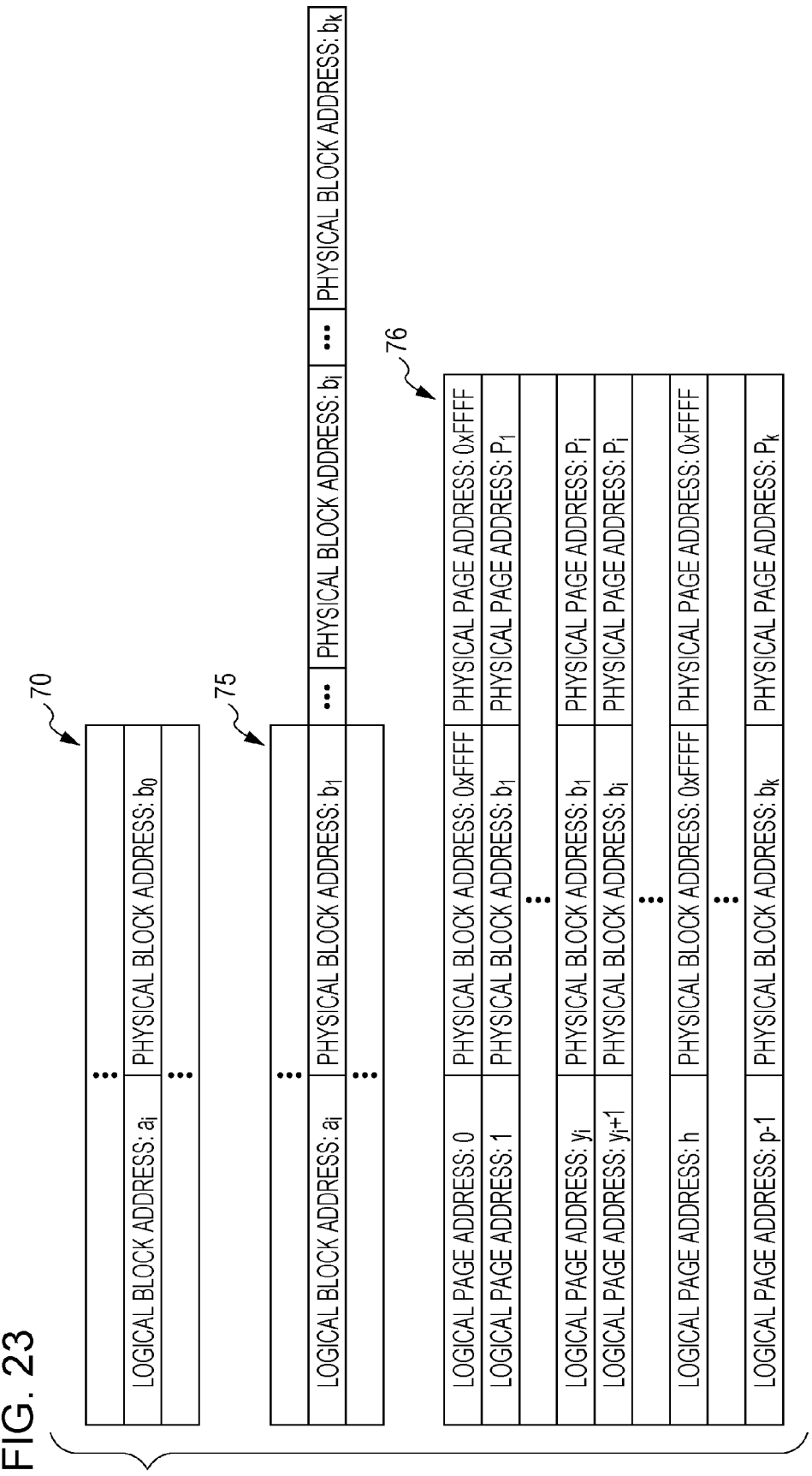
FIG. 23 illustrates, as an example, the content of a block-level management table, a page-level management table, and a page-level map before the data shift shown in FIG. 22.

As in the examples shown in FIGS. 22 and 23, in a case where the old data of the logical block $a_i$ has been written to a certain physical block (a physical block address $b_0$ in the example of FIGS. 22 and 23), and this data has been placed under the block-level management, as the consequence of the execution of the garbage collection of the page-level management blocks, the physical block of the relevant physical block address $b_0$ should be handled as being erasable. For this reason, in the case of the examples shown in FIGS. 22 and 23, at the time of the garbage collection of the page-level management blocks, a process for registering the relevant physical block address $b_0$ to the invalid data block management table 78 is also performed.

Referring back to FIG. 21, a description will be given.

After the execution of the garbage collection in step S404, a new registration process for the page-level management table 75 in step S405 above is performed. A description will be given for confirmation. The registration process of step S405 is a process for obtaining one physical block address from among the not yet written physical blocks and for newly writing the value of the obtained physical page address in the page-level management table 75 in such a manner as to be associated with the value of the logical block address for the object of the relevant writing-in-logical-block process.

After the execution of the registration process of step S404, the process proceeds to step S406 above, where writing to the page-level management block 40 is performed.

Then, after the execution of the writing in step S406, in step S407, the update of the page-level map 76 is performed. That is, the value of the page-level map 76 corresponding to the data that has been received from the host device 5 side and written is updated.

Figures 25A, 25B:
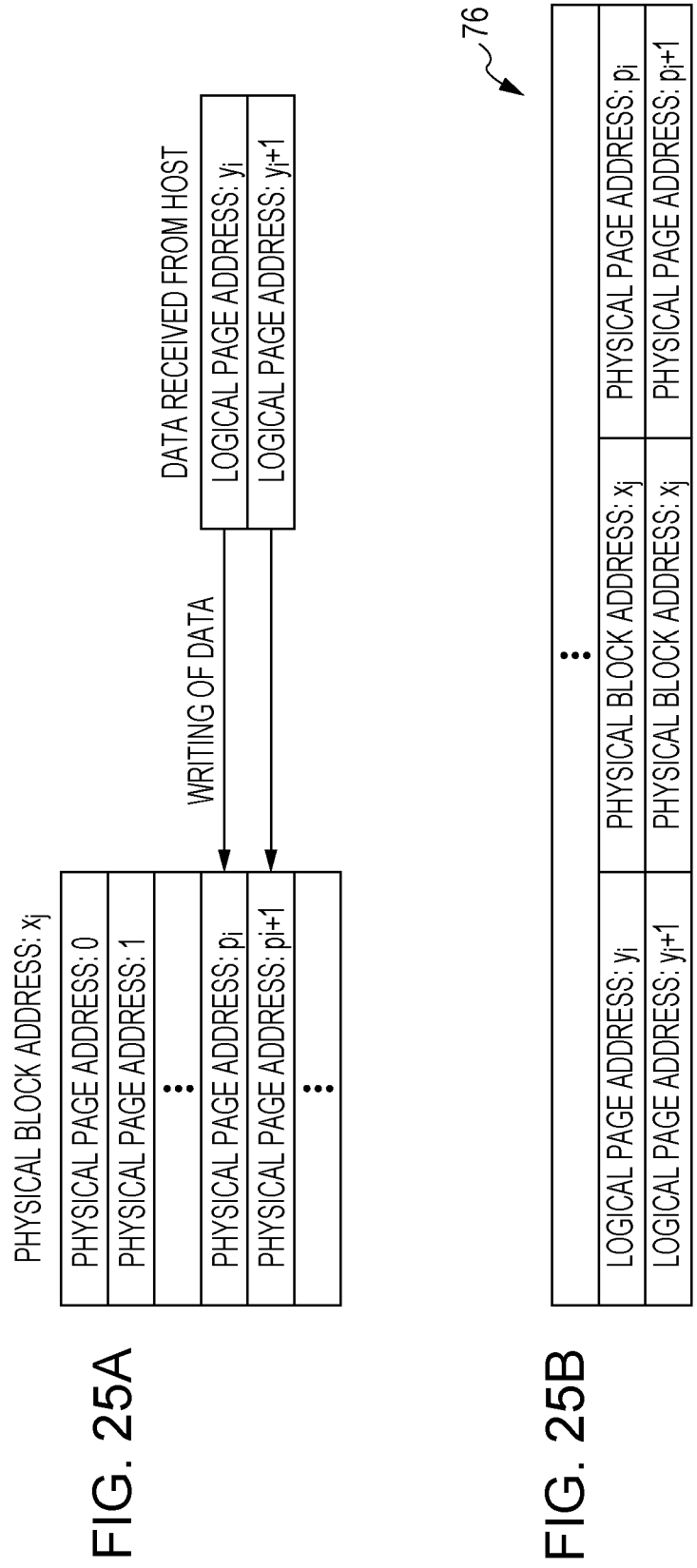
FIGS. 25A and 25B illustrate an example of data writing performed as writing to a page-level management block, and an example of a page-level map after the page-level map is updated after the data writing, respectively.

FIGS. 25A and 25B illustrate an example of data writing performed as writing (S406) to the page-level management block 40, and an example of the page-level map 76 after the execution of the update (S407) of the page-level map 76, respectively.

It is assumed that, for example, in the writing to the page-level management block 40 of step S406, the data of the logical page addresses $y_i$ and $y_i+1$ is written to the physical page addresses $p_i$ and $p_i+1$ of the physical block address $x_j$, respectively, as shown in g. 25.

In the page-level map 76 at this time, the value of the logical block address and the value of the physical page address corresponding to the logical page addresses $y_i$ and $y_i+1$ are updated as shown in FIG. 25B.

Referring back to FIG. 21, after the execution of the map update process of step S407, in step S408, it is determined whether or not the writing of all the data has been completed. That is, it is determined whether or not all the data at a size, which is specified from the host device 5 side, has been written in the logical block address for the object of the relevant writing-in-logical-block process.

When, in step S408, a negative result that the writing of all the data has not yet been completed is obtained, the process returns to earlier step S403, where it is determined once more whether or not the number of physical blocks that are managed using the page-level management table 75 is smaller than "f".

On the other hand, when, in step S408, an affirmative result is obtained because the writing of all the data is completed, the writing-in-logical-block process (S103) is completed.

As has been described in the foregoing, in the present embodiment, sequential writing is made possible for data having a size smaller than the block size at which it is difficult to perform recording by block-level management.

In a flash memory device of the related art in which data writing is performed in accordance with two types of management, that is, block-level management and page-level management, in a case where data to be written matches the block size, recording by block level management is performed, and data having a size smaller than the block size is written under page level management. For this reason, even if, for example, the data having a size smaller than the block size is individual data that is consecutive in a logical address manner, writing under page level management is typically performed with regard to those data.

In comparison, according to the present embodiment, sequential writing can be performed with regard to data having a size smaller than the block size. That is, for example, in such a case as described above, it is possible to effectively prevent individual data from being distributed to different physical blocks and recorded as in writing under page level management.

That is, according to the present embodiment in which sequential writing is made possible, it is possible to effectively decrease the generation frequency of garbage collection when compared to the related art in which only the writing by page level management is a choice with regard to data having a size smaller than the block size. As a result, performance improvement can be achieved in terms of recording speed in comparison with the related art.

Furthermore, as has been described above, in the related art, in a case where the host device 5 side is provided with only a buffer memory having a size smaller than the block size, it is possible for the host device 5 side to send only the data having a size smaller than the block size (in this case, for example, the sending form shown in FIG. 13 is taken). Therefore, also in this case, even if data is consecutive in a logical address manner, in the flash memory device of the related art, writing by page level management is selected.

In comparison, according to the present embodiment in which sequential writing is made possible, even when only data having a size smaller than the block size can be sent from the host device 5 side, it is possible to sequentially write on those data. As a result, unlike the case in which recording by page level management is performed, it is possible to decrease the generation frequency of garbage collection, and it is possible to realize high-speed recording. That is, also in a case where writing from the host device 5 in which the buffer memory size for data transfer is small, it is possible to realize high-speed data recording.

2. Second Embodiment

Next, a description will be given of a second embodiment of the present disclosure.

As described above, the second embodiment is such that the host device 5 explicitly notifies the flash memory device 1 side of the switching of the writing technique by using a command, and the flash memory device 1 changes the data writing technique in response to the relevant notification.

In the second embodiment, in addition to that the host device 5 instructs sequential writing in the manner described above, the content of processing related to the memory control technique performed in the flash memory device 1 differs from the case of the first embodiment. In the second embodiment, a program to be executed mainly by the memory controller 3 shown in FIG. 1 has been changed from the program in the first embodiment, and the internal configuration of the flash memory device 1 is the same as that shown in FIG. 1.

Figure 26:
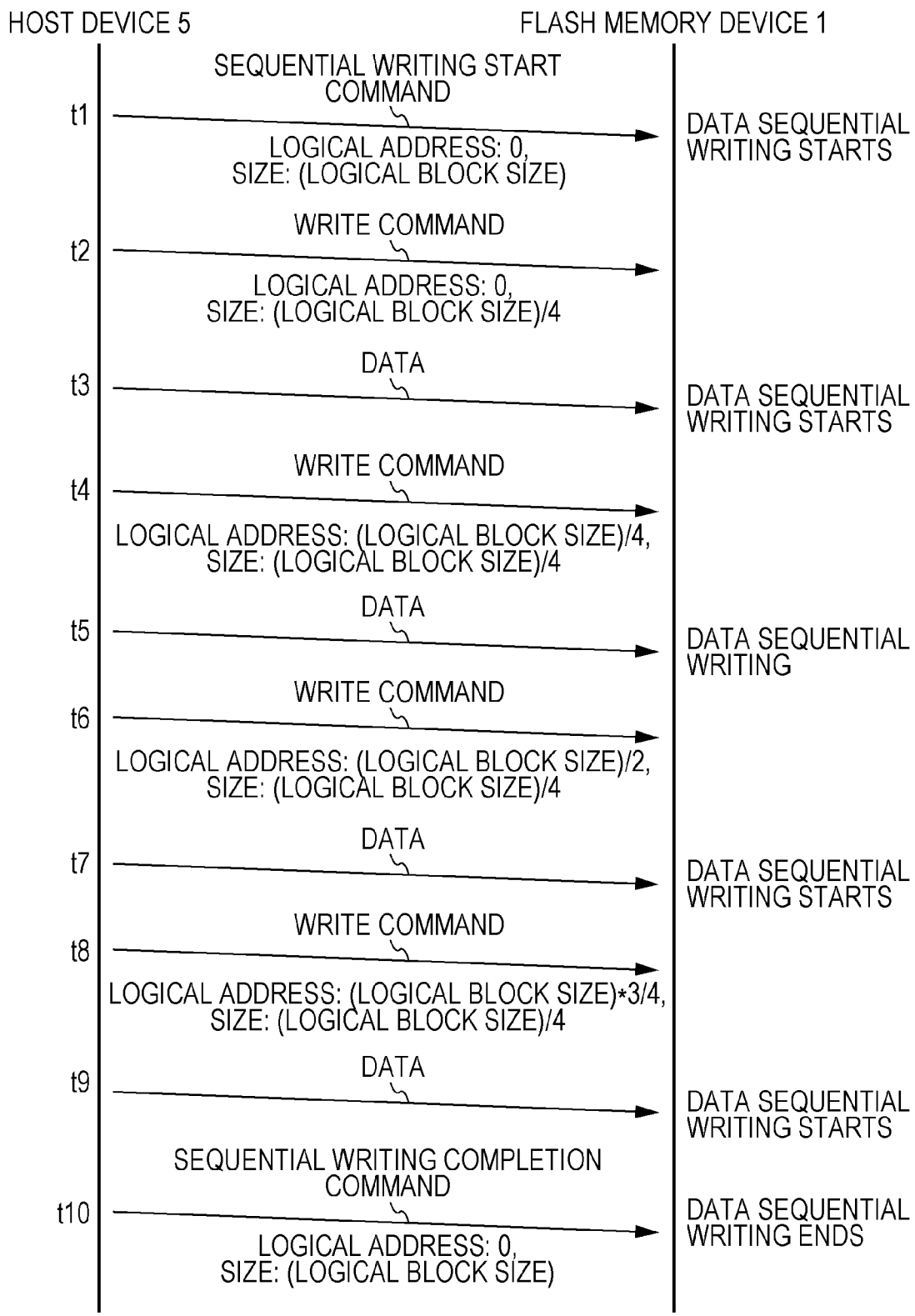
FIG. 26 illustrates an example of writing instruction performed in a case where a host device causes a flash memory device to perform sequential writing in a second embodiment.

FIG. 26 illustrates an example of writing instruction performed in a case where the host device 5 in the second embodiment causes the flash memory device 1 to perform sequential writing.

When the host device 5 in this case causes the flash memory device 1 to perform sequential writing, the host device 5 sends a sequential writing start command to the flash memory device 1 side, as indicated by time t1 in FIG. 26. In the sequential writing start command, as shown in FIG. 26, the logical address serving as the writing start address of data for the object of sequential writing, and the size (total size) of the data that is desired to be sequentially written are designated together. In this case, the logical address of writing start is "0", as shown in FIG. 26.

Also in FIG. 26, similarly to the case of FIG. 13 earlier, an example is shown in which the data size of logical block size/4 is designated as the writing data size in each write command, and writing instruction for the amount of one logical block size is made in total.

For this reason, the data size designated by the sequential writing start command at time t1 in this case is the "logical block size" as shown in FIG. 26.

After the sequential writing start command is sent at time t1, similarly to the case of FIG. 13, the host device 5 performs the sending of a write command in which the logical address and the writing size are designated, and writing data in sequence to the flash memory device 1. In the example of this case, data sending at time t9 is the final sending of data to be sequentially written to the flash memory device 1 side.

After the sending of the final writing data, the host device 5 in this case sends a sequential writing completion command (time t10). For this sequential writing completion command, similarly to the earlier sequential writing start command, the logical address and the size (total size) of the writing data are specified together.

Here, the host device 5 in this case is devised such that only when it is desired to cause sequential writing to be performed, the host device 5 sends a writing start command indicating the intent, does not specially send a writing start command indicating the intent regarding other block level writing and page level writing, and send a write command in which the logical address and the writing data size are designated as usual.

Next, the outline of processing performed on the flash memory device 1 side in this case will be described.

Figure 27:
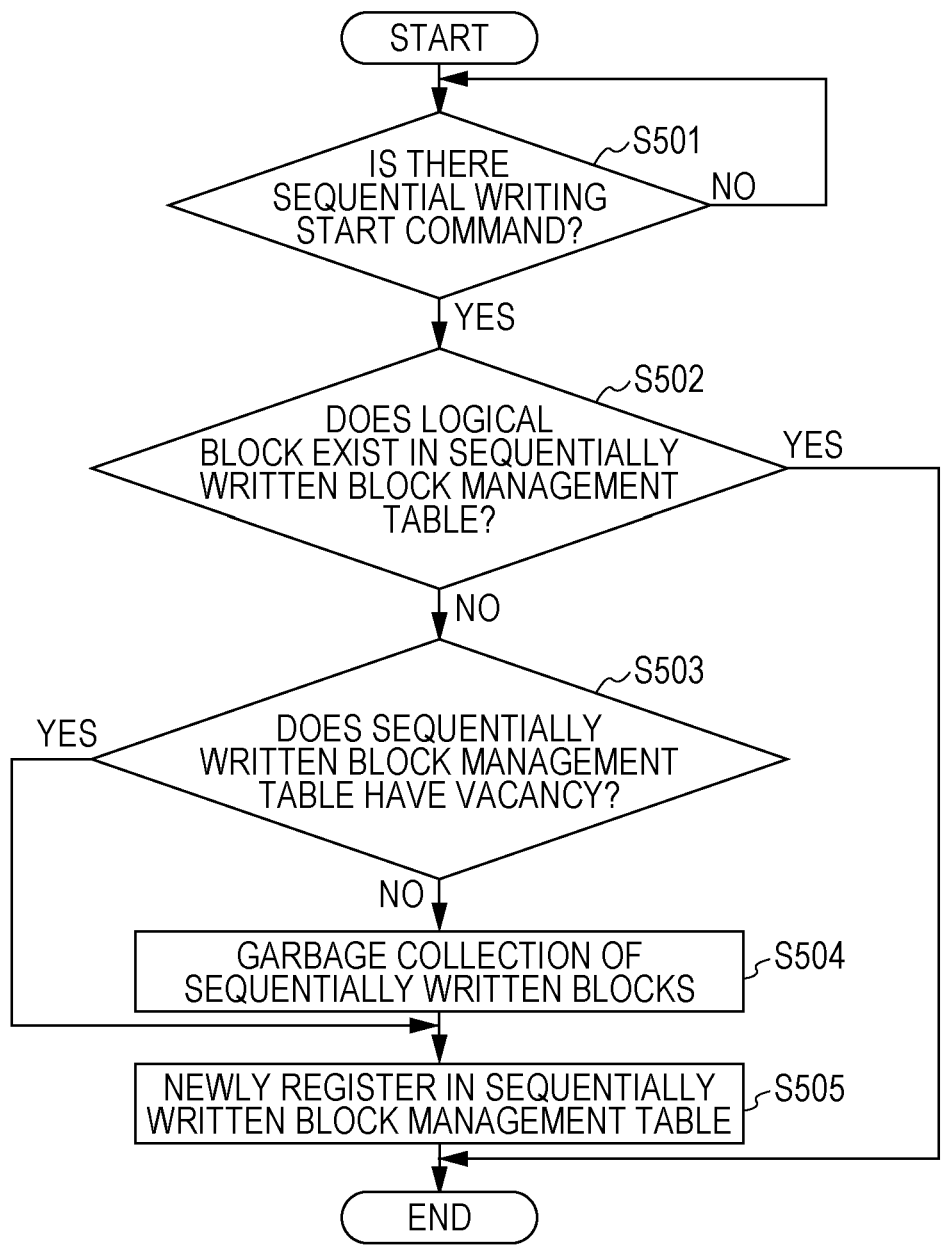
FIG. 27 is a flowchart illustrating the content of a sequential writing start command handling process.

In the flash memory device 1 of the second embodiment, as processing corresponding to the sequential writing start command from the host device 5 side, processing shown in FIG. 27 is performed.

Figure 28:
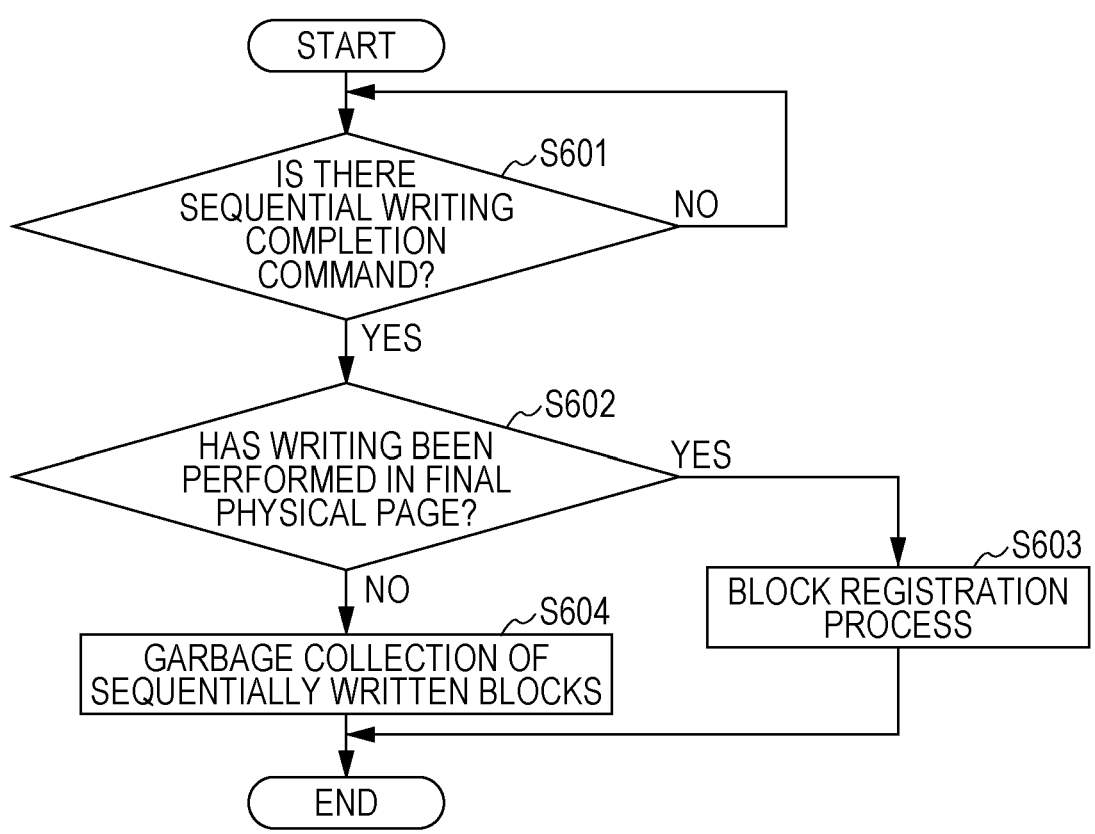
FIG. 28 is a flowchart illustrating the content of a sequential writing completion command handling process.

Furthermore, as processing corresponding to the sequential writing completion command from the host device 5 side, processing shown in FIG. 28 is performed.

Figure 29:
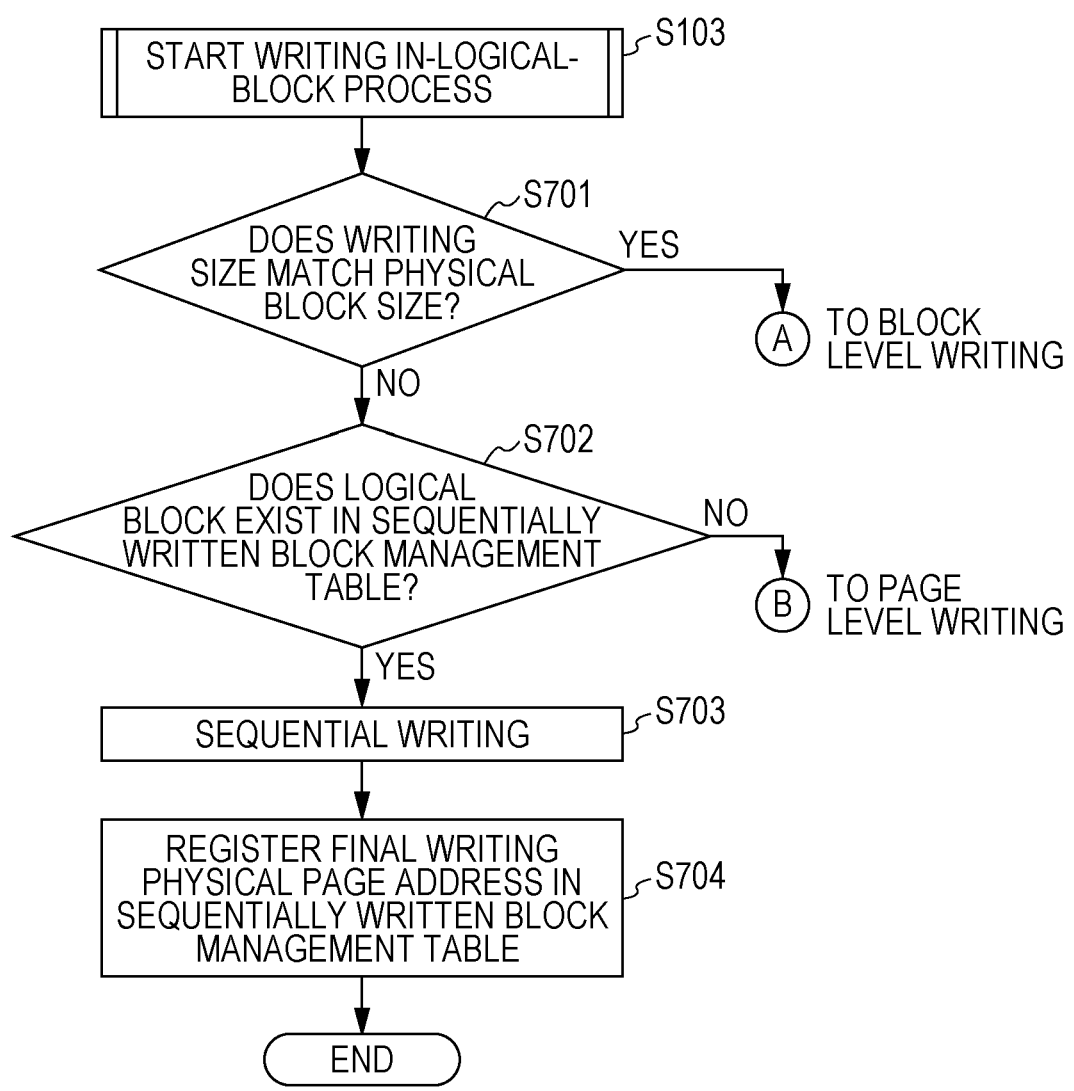
FIG. 29 is a flowchart illustrating the content of a writing-in-logical-block process in the second embodiment.

In addition, also in the flash memory device 1 of the second embodiment, as processing corresponding to the write command, the processing shown in FIG. 14 earlier is performed. However, the case of the second embodiment differs from that of the first embodiment in that in the second embodiment, the processing shown in FIG. 29 is performed as the writing-in-logical-block process of step S103.

The processes shown in FIGS. 27, 28, and 14 are performed as parallel processes by the memory controller 3.

For example, in a case where the sequential writing start command is received from the host device 5 side, an affirmative result is obtained at step S501 of FIG. 27, and a process for securing a new sequential writing management block 50 is performed except for a case in which the sequential writing management block 50 has already been assigned to the logical block address specified using the sequential writing start command from the host device 5 side.

Then, after the above-mentioned sequential writing start command is received, in a case where the write command is received from the host device 5 side, a series of processes involving the writing-in-logical-block process (S103) shown in FIG. 14 is performed. In the manner described above, in the case of the second embodiment, for the writing-in-logical-block process (S103), the process shown in FIG. 29 is performed.

Furthermore, in a case where a sequential writing completion command is received from the host device 5 side, an affirmative result is obtained in step S601 of FIG. 28, and a process corresponding to whether or not writing has been performed up to the final physical page in the target block by sequential writing is performed.

Furthermore, in a case where the write command is issued from the host device 5 side without involving a sequential writing start command, it is determined whether or not block level writing should be performed or page level writing should be performed according to the process shown in FIG. 28.

Hereinafter, processes of FIGS. 27 to 29, which are performed by the flash memory device 1 of the second embodiment, will be specifically described.

First, a process corresponding to the sequential writing start command shown in FIG. 27 will be described.

In FIG. 27, in step S501, waiting for a sequential writing start command from the host device 5 side to be received is performed.

Then, in a case where the sequential writing start command is received, the process proceeds to step S502.

In step S502, it is determined whether or not the logical block exists in the sequential writing block management table 77. The content of this process is the same as the processing content of step S202 earlier, which is described with reference to FIG. 15.

When, in step S502, an affirmative result is obtained because a logical block exists in the sequential writing block management table 77, the processing shown in FIG. 27 is completed.

On the other hand, when, in step S502, a negative result is obtained because a logical block does not exist in the sequential writing block management table 77, it is determined in step S503 whether or not the sequential writing block management table 77 has a vacancy.

When, in step S503, an affirmative result is obtained because the sequential writing block management table 77 has a vacancy, the process proceeds to step S505, where new registration is performed in the sequential writing block management table 77. That is, the logical block address specified by the sequential writing start command received in step S501 is registered in the sequential writing block management table 77, and the sequential writing block 50 is assigned to the relevant logical block address.

On the other hand, when, in step S503, a negative result is obtained because the sequential writing block management table 77 has no vacancy, the process proceeds to step S504, where garbage collection of the sequential writing blocks is performed. The content of the garbage collection process of step S504 is the same as the garbage collection process of step S206 earlier, and thus, repeated description is omitted.

After the execution of the garbage collection of step S504, a new registration process in step S505 is performed.

After the execution of the new registration process in step S505, the sequential writing start command handling process shown in FIG. 27 is completed.

A process corresponding to a sequential writing completion command will be described with reference to FIG. 28.

In FIG. 28, in step S601, waiting for a sequential writing completion command to be received from the host device 5 side is performed.

In a case where the sequential writing completion command is received, the process proceeds to step S602.

In step S602, it is determined whether or not writing has been performed in the final physical page. That is, similarly to the process of earlier step S212, it is determined whether or not data has been written in all the physical pages in the sequential writing block 50 that is assigned to the logical block in which writing has been performed.

When, in step S602, an affirmative result is obtained because writing has been performed in the final physical page, the process proceeds to step S603, where a block registration process is performed.

That is, as a result, the sequential writing block 50 that has been written up to the final physical page is newly placed under the block-level management.

The block registration process of step S603 is the same as the block registration process of step S214 earlier. Therefore, in a case where overwriting at a logical level has occurred, it follows that a process for making old data for the object of overwriting handled as having been deleted is also performed.

On the other hand, when, in step S602, a negative result is obtained because writing has not been performed in the final physical page, the process proceeds to step S604, where garbage collection of the sequential writing blocks is performed. The garbage collection process of step S604 is the same the garbage collection process of earlier step S206.

As the processing in step S604, which is performed in correspondence with a case in which writing has been performed to the final physical page, rather than a garbage collection process of the sequential writing blocks such as that described above, the process of "registering the final writing physical page address in the sequential writing block 77", which is the same as that of earlier step S213, can also be performed.

However, in this case, a sequential writing completion command has been received from the host device 5 side (in this case, it can be assumed that no more data to be sequentially written exists on the host device 5 side). Consequently, hereinafter, the probability that additional recording occurs in the sequential writing block 50 used in the relevant sequential writing is low. Therefore, it can be mentioned that the garbage collection of the sequential writing blocks such as that described above is more desirable from the viewpoint that a vacancy is secured in the sequential writing block management table 77.

After the execution of the block registration process of step S603 or the garbage collection process of step S604, the sequential writing completion command handling process shown in this figure is completed.

The writing-in-logical-block process (S103) in the case of the second embodiment will be described with reference to FIG. 29.

In FIG. 29, similarly to earlier step S201, in step S701, it is determined whether or not the writing size matches the physical block size.

When, in step S701, an affirmative result is obtained because the writing size matches the physical block size, also in this case, the process shifts to a process for block level writing shown in FIG. 16.

On the other hand, when, in step S701, a negative result is obtained because the writing size does not match the physical block size, in step S702, it is determined whether or not a logical block exists in the sequential writing block management table 77. The determination process of step S702 is the same as the determination process in step S202 earlier.

When, in step S702, a negative result is obtained because a logical block does not exist in the sequential writing block management table 77, the process shifts to a process for page level writing shown in FIG. 21.

On the other hand, when, in step S702, an affirmative result is obtained because a logical block exists in the sequential writing block management table 77, the process proceeds to step S703, where sequential writing is performed.

Here, in a case where the sequential writing start command from the host device 5 side is received, the sequential writing block 50 is typically assigned to the relevant logical block in consequence of the process of FIG. 27 earlier. As a result, sequential writing is performed to the assigned sequential writing block 50 in step S703.

After the execution of the sequential writing in step S703, in step S704, a process for registering the final writing physical page address in the sequential writing block 77 is performed.

After the execution of the registration process in step S703, the writing-in-logical-block process (S103) in this case is completed.

The second embodiment described in the foregoing is the same as the first embodiment in that sequential writing is possible with regard to data having a size smaller than the block size in the flash memory device 1. Thus, similarly to the first embodiment, higher recording speed can be achieved in comparison with the related art.

Furthermore, also in a case where writing from the host device 5, in which the buffer memory size for data transfer is smaller than the block size, is performed, the second embodiment is the same as the first embodiment in that high-speed data recording can be realized.

3. Modification

Although the embodiments according to the present disclosure have been described above, the present disclosure should not be limited to the specific examples described in the foregoing.

For example, the host device 5 forming a storage system should not be limited to a digital camera device. Another information processing device, such as, for example, a personal computer, may be used.

Furthermore, the flash memory device 1 should not be limited to a card-shaped memory device as a memory card, and a memory device including a flash memory, such as, for example, a solid state drive (SSD), may be used.

The present disclosure can take the following configurations described in (1) to (15) below.

(1) A flash memory device including:
a flash memory unit; and
a control unit configured to perform control so that data having a size smaller than a block size of the flash memory unit is sequentially written to the flash memory unit.

(2) The flash memory device as set forth in the above (1), wherein the control unit determines whether or not the size of data that is instructed to be written from an external device is less than the block size, and performs control so that the data having a size smaller than the block size is sequentially written into the flash memory unit on the basis of the result.

(3) The flash memory device as set forth in the above (2), wherein the control unit
determines whether or not data in a logical block address to which the writing-instructed data belongs was sequentially written in the past,
further determines whether or not a size of the writing-instructed data is greater than or equal to 1/n (n is a natural number of two or more) of the block size, and
performs control so that the sequential writing is performed when the size of the writing-instructed data is less than the block size, the data in the logical block address to which the writing-instructed data belongs was not sequentially written in the past, and the size of the writing-instructed data is greater than or equal to 1/n of the block size.

(4) The flash memory device as set forth in the above (3), wherein the control unit
further determines whether or not both a writing start logical page address and a writing start logical sector address of the writing-instructed data indicate a beginning address, and
performs control so that the sequential writing is performed when the size of the writing-instructed data is less than the block size, the data in the logical block address to which the writing-instructed data belongs was not sequentially written in the past, the size of the writing-instructed data is greater than or equal to 1/n of the block size, and both the writing start logical page address and the writing start logical sector address indicate a beginning address.

(5) The flash memory device as set forth in the above (4), wherein the control unit determines whether or not the number of blocks used as sequential writing blocks has reached an upper limit value, and performs garbage collection of the sequential writing blocks that are selected from among the sequential writing blocks in use when the number of blocks used as the sequential writing blocks has reached the upper limit value.

(6) The flash memory device as set forth in the above (2), wherein the control unit
further determines whether or not the data in the logical block address to which the writing-instructed data belongs was sequentially written in the past, and
performs, when the data in the logical block address to which the writing-instructed data belongs was sequentially written in the past, and a sequential writing block that is being written exists, control so that the writing-instructed data is additionally recorded to the sequential writing block being written on the basis of a result regarding whether or not at least the writing start logical page address of the writing-instructed data is consecutive to the final writing logical page address of the sequential writing block in the middle of being written with data.

(7) The flash memory device as set forth in the above (6), wherein the control unit
further determines whether or not the size of the writing-instructed data is a multiple of the page size of the flash memory unit, and
performs control so that the writing-instructed data is additionally recorded to the sequential writing block in the middle of being written with data when a sequential writing block in the middle of being written with data exists, the writing start logical page address of the writing-instructed data is consecutive to the final writing logical page address of the sequential writing block in the middle of being written with data, and the size of the writing-instructed data is a multiple of the page size.

(8) The flash memory device as set forth in the above (4), wherein the control unit
further determines whether or not the size of the writing-instructed data is a multiple of a page size of the flash memory unit, and
performs control so that sequential writing is performed when the size of the writing-instructed data is less than the block size, the data in the logical block address to which the writing-instructed data belongs was not sequentially written in the past, the size of the writing-instructed data is greater than or equal to 1/n of the block size, both the writing start logical page address and the writing start logical sector address indicate a beginning address, and the size of the writing-instructed data is a multiple of the page size.

(9) The flash memory device as set forth in the above (2), wherein when the size of the writing-instructed data matches the block size of the flash memory unit, the control unit performs control so that writing-instructed data is written under block level management.

(10) flash memory device as set forth in the above (2) to (9), wherein the control unit
determines whether or not the data in the logical block address to which the writing-instructed data belongs was sequentially written in the past,
further determines whether or not the size of the writing-instructed data is greater than or equal to 1/n of the block size, and
performs control so that the writing-instructed data is written under page level management when the size of the writing-instructed data is less than the block size, the data in the logical block address to which the writing-instructed data belongs was not sequentially written in the past, the size of the writing-instructed data is not greater than or equal to 1/n of the block size.

(11) flash memory device as set forth in the above (2) to (10), wherein the control unit determines whether or not the data in the logical block address to which the writing-instructed data belongs was sequentially written in the past, and further determines whether or not both the writing start logical page address and the writing start logical sector address of the writing-instructed data indicate a beginning address, and performs control so that the writing-instructed data is written under page level management when the size of the writing-instructed data is less than the block size, the data in the logical block address to which the writing-instructed data belongs was not sequentially written in the past, and a condition in which both the writing start logical page address and the writing start logical sector address of the writing-instructed data indicate a beginning address is not satisfied.

(12) The flash memory device as set forth in the above (2) to (11), wherein the control unit determines whether or not the data in the logical block address to which the writing-instructed data belongs was been sequentially written in the past, further determines whether or not the size of the writing-instructed data is a multiple of a page size of the flash memory unit, and performs control so that the writing-instructed data is written under page level management when the size of the writing-instructed data is less than the block size, the data in the logical block address to which the writing-instructed data belongs was not sequentially written in the past, and the size of the writing-instructed data is not a multiple of the page size.

(13) The flash memory device as set forth in the above (2) to (12), wherein the control unit determines whether or not the data in the logical block address to which the writing-instructed data belongs was sequentially written in the past, further determines whether or not the writing start logical page address of the writing-instructed data is consecutive to the final writing logical page address of the sequential writing block in the middle of being written with data, and performs control so that the writing-instructed data is written under page level management when the data in the logical block address to which the writing-instructed data belongs was sequentially written in the past, a sequential writing block in the middle of being written with data exists, and the writing start logical page address of the writing-instructed data is not consecutive to the final writing logical page address of the sequential writing block in the middle of being written with data.

(14) The flash memory device as set forth in the above (2) to (13), wherein the control unit determines whether or not the data in the logical block address to the which writing-instructed data belongs was sequentially written in the past, and further determines whether or not the size of the writing-instructed data is a multiple of the page size of the flash memory unit, and performs control so that the writing-instructed data is written under page level management when the data in the logical block address to which the writing-instructed data belongs was sequentially written in the past, a sequential writing block in the middle of being written with data exists, and the size of the writing-instructed data is not a multiple of the page size.

(15) The flash memory device as set forth in the above (1), wherein in response to a sequential writing instruction from an external device, the control unit performs control so that data having a size smaller than the block size of the flash memory unit is sequentially written to the flash memory unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A flash memory device comprising:
a flash memory unit; and
a control unit configured to:
determine whether data in a logical block address to which data instructed to be written belongs was sequentially written in the past;
determine whether a size of the data instructed to be written into the flash memory unit is greater than or equal to 1/n of a block size of the flash memory unit, wherein n is greater than or equal to 2; and
perform control to sequentially write the data instructed to be written to the flash memory unit based on the determination; and
sequentially write the data instructed to be written into the flash memory unit when the size of the data instructed to be written is less than the block size, the data in the logical block address to which the data instructed to be written belongs was not sequentially written in the past, and the size of the data instructed to be written is greater than or equal to 1/n of the block size.

2. The flash memory device according to claim 1, wherein the control unit determines whether or not the size of the data that is instructed to be written from an external device is less than the block size, and performs control such that the data having a size smaller than the block size is sequentially written to the flash memory unit based on the determination.

3. The flash memory device according to claim 1, wherein the control unit is configured to:
determine whether the size of the data instructed to be written is a multiple of a page size of the flash memory unit; and
perform control so that sequential writing is performed when the size of the data instructed to be written is less than the block size, the data in the logical block address to which the data instructed to be written belongs was not sequentially written in the past, the size of the data instructed to be written is greater than or equal to 1/n of the block size, both a writing start logical page address and a writing start logical sector address indicate a beginning address, and the size of the data instructed to be written is a multiple of the page size.

4. The flash memory device according to claim 1, wherein when the size of the data instructed to be written matches the block size of the flash memory unit, the control unit is configured to write the data instructed to be written under block level management.

5. The flash memory device according to claim 1, wherein the control unit is configured to:
write the data instructed to be written under page level management when the size of the data instructed to be written is less than the block size, the data in the logical block address to which the data instructed to be written belongs was not sequentially written in the past, and the size of the data instructed to be written is not greater than or equal to 1/n of the block size.

6. The flash memory device according to claim 1, wherein the control unit is configured to:
write the data instructed to be written under page level management when the size of the data instructed to be written is less than the block size, the data in the logical block address to which the data instructed to be written belongs was not sequentially written in the past, and when a writing start logical page address and a writing start logical sector address of the data instructed to be written do not indicate a beginning address.

7. The flash memory device according to claim 1, wherein the control unit is configured to:
write the data instructed to be written under page level management when the size of the data instructed to be written is less than the block size, the data in the logical block address to which the data instructed to be written belongs was not sequentially written in the past, and the size of the data instructed to be written is not a multiple of a page size of the flash memory unit.

8. The flash memory device according to claim 1, wherein the control unit is configured to:
write the data instructed to be written under page level management when the data in the logical block address to which the data instructed to be written belongs was sequentially written in the past, a sequential writing block in the process of being written with data exists, and a writing start logical page address of the data instructed to be written is not consecutive to a final writing logical page address of the sequential writing block.

9. The flash memory device according to claim 1, wherein the control unit is configured to:
write the data instructed to be written under page level management when the data in the logical block address to which the data instructed to be written belongs was sequentially written in the past, a sequential writing block in the process of being written with data exists, and the size of the data instructed to be written is not a multiple of a page size of the flash memory unit.

10. The flash memory device according to claim 1, wherein, in response to a sequential writing instruction from an external device, the control unit performs control such that the data having a size smaller than the block size of the flash memory unit is sequentially written to the flash memory unit.

11. The flash memory device according to claim 1, wherein the control unit configured to:
determine whether a size of data instructed to be written into the flash memory unit is less than a block size of the flash memory unit; and
perform the control to sequentially write the data instructed to be written to the flash memory unit based on the determination.

12. The flash memory device according to claim 1, wherein the control unit is configured to:
determine whether a writing start logical page address and a writing start logical sector address of the data instructed to be written indicate a beginning address, and
sequentially write the data instructed to be written if the size of the data instructed to be written is less than the block size, the data in the logical block address to which the data instructed to be written belongs was not sequentially written in the past, the size of the data instructed to be written is greater than or equal to 1/n of the block size, and both the writing start logical page address and the writing start logical sector address indicate the beginning address.

13. The flash memory device according to claim 12, wherein the control unit is configured to:
determine whether a number of blocks used as sequential writing blocks has reached an upper limit value; and
perform garbage collection of the sequential writing blocks that are selected from among the sequential writing blocks in use when the number of blocks used as the sequential writing blocks has reached the upper limit value.

14. The flash memory device according to claim 1, wherein the control unit is configured to:
determine whether data in the logical block address to which the data instructed to be written belongs was sequentially written in the past and whether a sequential writing block in the process of being written with data exists; and
additionally write the data instructed to be written to the sequential writing block when a writing start logical page address of the data instructed to be written is consecutive to a final writing logical page address of the sequential writing block.

15. The flash memory device according to claim 14, wherein the control unit is configured to:
determine whether the size of the data instructed to be written is a multiple of a page size of the flash memory unit; and
additionally record the data instructed to be written to the sequential writing block when the writing start logical page address of the data instructed to be written is consecutive to the final writing logical page address of the sequential writing block in the process of being written with data, and when the size of the data instructed to be written is a multiple of the page size.

16. A memory control device comprising:
one or more circuits operable to:
determine whether a size of data instructed to be written into a flash memory unit is less than a block size of the flash memory unit and greater than or equal to 1/n of the block size of the flash memory unit, wherein n is greater than or equal to two;
determine whether data in a logical block address to which the data instructed to be written belongs was sequentially written in the past;
perform control to write the data to the flash memory unit based on the determination; and
write the data instructed to be written under page level management when the size of the data instructed to be written is less than the block size, the data in the logical block address to which the data instructed to be written belongs was not sequentially written in the past, and the size of the data instructed to be written is not greater than or equal to 1/n of the block size.

17. A memory control method comprising:
determining whether a size of data instructed to be written into a flash memory unit is less than a block size of the flash memory unit and greater than or equal to 1/n of the block size of the flash memory unit, wherein n is greater than or equal to two; determining whether data in a logical block address to which the data instructed to be written belongs was sequentially written in the past;
performing control to sequentially write the data to the flash memory unit based on the determination; and
sequentially writing the data instructed to be written if the size of the data instructed to be written is less than the block size, the data in the logical block address to which the data instructed to be written belongs was not sequentially written in the past, and the size of the data instructed to be written is greater than or equal to 1/n of the block size.

18. A storage system comprising:
a flash memory unit;
a control unit configured to:
- determine whether a size of data that is instructed to be written from an external device into the flash memory unit is less than a block size of the flash memory unit;
- determine whether another data in a logical block address to which the data instructed to be written belongs was sequentially written in the past; and
- determine whether the size of the data instructed to be written is greater than or equal to 1/n of the block size of the flash memory unit, wherein n is a natural number greater than or equal to two; and
- perform control to sequentially write the data instructed to be written when the size of the data instructed to be written is less than the block size, the another data in the logical block address to which the data instructed to be written belongs was not sequentially written in the past, and the size of the data instructed to be written is greater than or equal to 1/n of the block size.

\* \* \* \* \*